US011287058B2

(12) United States Patent
Horikawa et al.

(10) Patent No.: US 11,287,058 B2
(45) Date of Patent: Mar. 29, 2022

(54) VALVE REMOVAL METHOD OF FLUID PIPELINE STRUCTURE, FLUID PIPELINE STRUCTURE, AND VALVE DEVICE

(71) Applicant: Waterworks Technology Development Organization Co., Ltd., Osaka (JP)

(72) Inventors: Go Horikawa, Osaka (JP); Shuhei Azuma, Osaka (JP)

(73) Assignee: WATERWORKS TECHNOLOGY DEVELOPMENT ORGANIZATION CO., Osaka (JP)

( * ) Notice: Subject to any disclaimer, the term of this patent is extended or adjusted under 35 U.S.C. 154(b) by 0 days.

(21) Appl. No.: 16/769,489

(22) PCT Filed: Jul. 9, 2018

(86) PCT No.: PCT/JP2018/025824
§ 371 (c)(1),
(2) Date: Jun. 3, 2020

(87) PCT Pub. No.: WO2019/116617
PCT Pub. Date: Jun. 20, 2019

(65) Prior Publication Data
US 2020/0386346 A1 Dec. 10, 2020

(30) Foreign Application Priority Data
Dec. 14, 2017 (JP) .............................. JP2017-239607

(51) Int. Cl.
*F16K 3/02* (2006.01)
*F16K 43/00* (2006.01)

(52) U.S. Cl.
CPC .......... *F16K 43/001* (2013.01); *F16K 3/0272* (2013.01); *Y10T 137/4273* (2015.04); *Y10T 137/8696* (2015.04)

(58) Field of Classification Search
CPC ................ F16K 43/001; F16K 3/0272; Y10T 137/0402; Y10T 137/8696; Y10T 137/4273
See application file for complete search history.

(56) References Cited

U.S. PATENT DOCUMENTS 3,170,226 A * 2/1965 Larry .................... F16K 3/0254
29/890.11
2004/0222399 A1* 11/2004 Maichel .................. F16L 41/06
251/326

(Continued)

FOREIGN PATENT DOCUMENTS

JP 200732769 A 2/2007
JP 2007309490 A 11/2007

(Continued)

OTHER PUBLICATIONS

Extended European Search Report issued in EP18888672.5 dated Jul. 5, 2021.
Office Action issued in JP2017239607 dated Dec. 27, 2021.

*Primary Examiner* — Kevin R Barss
(74) *Attorney, Agent, or Firm* — The Webb Law Firm

(57) ABSTRACT

A valve removal method of a fluid pipeline structure, which removes an unnecessary portion of a valve device from a connection port portion side of a pipe without flow disruption in the fluid pipeline structure that detachably includes the valve device including a valve body, which is openable and closeable from a direction intersecting a flow path axis of a connection port portion, on the connection port portion side of the pipe connected to a fluid piping system includes a valve body fixing step of fixing the valve body at a closed valve position to the connection port portion side in a sealed manner; and a valve component removing step of removing other unnecessary valve components of the valve device in (Continued)

a state where the valve body which is fixed in a sealed manner is left on the connection port portion side.

10 Claims, 27 Drawing Sheets

(56) References Cited

U.S. PATENT DOCUMENTS

2012/0222750 A1* 9/2012 Wong ................ F16K 27/067
137/14
2016/0230897 A1  8/2016 Munetomo et al.

FOREIGN PATENT DOCUMENTS

| JP | 2011122721 A | 6/2011 |
| JP | 2013249862 A | 12/2013 |
| JP | 2014109325 A | 6/2014 |
| JP | 2014114827 A | 6/2014 |

* cited by examiner

FIG. 22 (a)
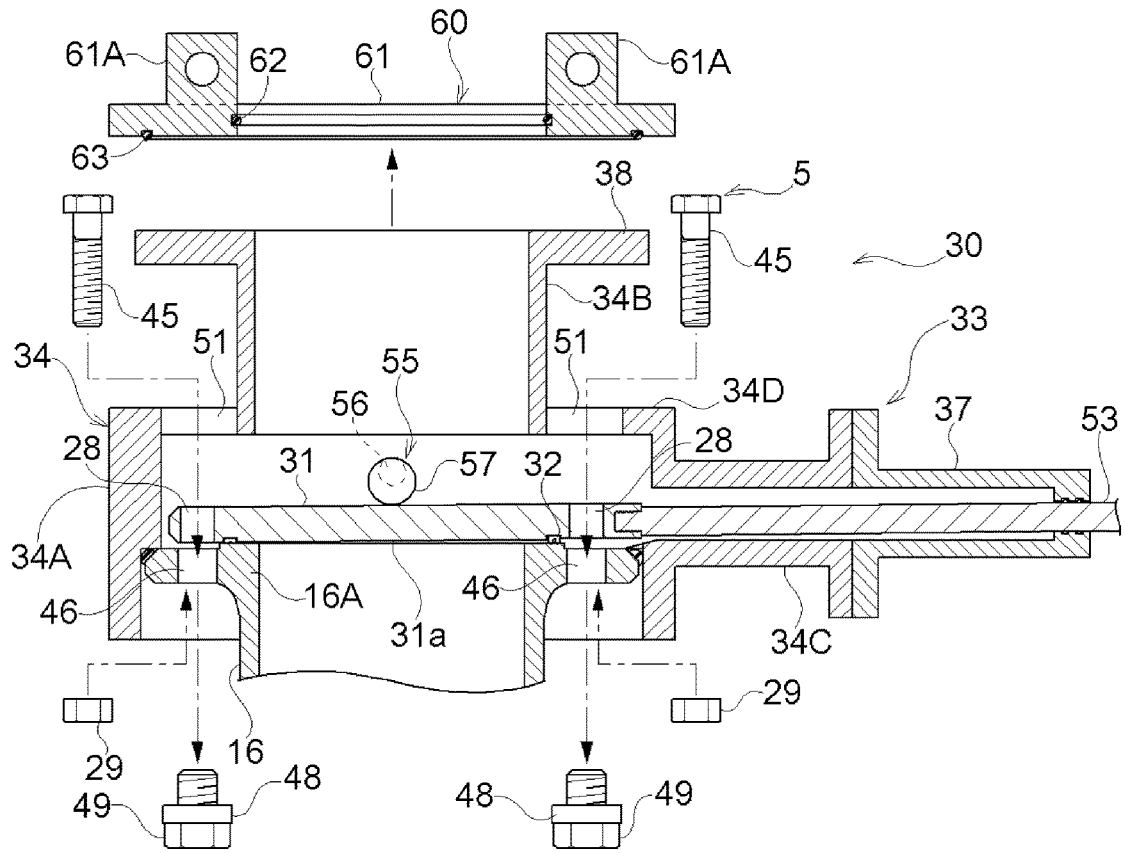
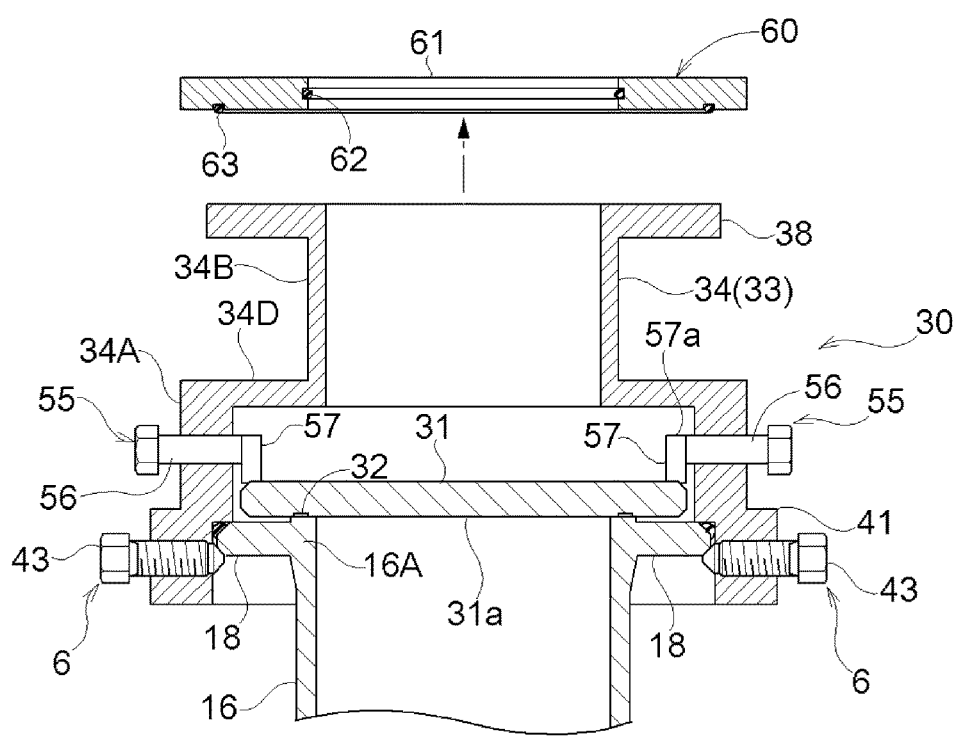
FIG. 22 (b)

VALVE REMOVAL METHOD OF FLUID PIPELINE STRUCTURE, FLUID PIPELINE STRUCTURE, AND VALVE DEVICE

CROSS-REFERENCE TO RELATED APPLICATIONS

This application is the United States national phase of International Application No. PCT/JP2018/025824 filed Jul. 9, 2018, and claims priority to Japanese Patent Application No. 2017-239607 filed Dec. 14, 2017, the disclosures of which are hereby incorporated by reference in their entirety.

BACKGROUND OF THE INVENTION

Field of the Invention

The present invention relates to a technique of removing an unnecessary portion of a valve device from a connection port portion side of a pipe without flow disruption in a fluid pipeline structure where the valve device including a valve body which is opened and closed from a direction intersecting a flow path axis of a connection port portion is provided on the connection port portion side of the pipe connected to a fluid piping system.

Description of Related Art

In a fluid pipeline structure, for example, a renewal work where a fluid pipe forming a pipeline or piping equipment such as a fire hydrant is renewed without flow disruption (without water disruption), or an earthquake resistance work where piping equipment for earthquake resistance is replaced without flow disruption is performed.

If one example of a method of the renewal and earthquake resistance work is described, a valve device including a valve body which can open and close a flow path from a direction intersecting a flow path axis is mounted on a connection port portion side of a branch pipe of a fluid pipe (one example of a pipe) that is positioned in a portion upstream of a work target region, or on a connection port portion side of a branch pipe of a split T-shaped pipe (one example of a pipe) which has a split structure and is externally mounted and fixed on the fluid pipe. A drilling device is mounted on the valve device, and in a state where the valve body is opened, a drilling portion of the drilling device is delivered inward to form a through-hole in a pipe wall of the fluid pipe. Subsequently, the drilling device is removed from the valve device in a state where the valve body is closed, and a flow path-closing device is mounted on the valve device. In a state where the valve body is opened, a flow path-closing portion of the flow path-closing device is delivered into a work target region in the pipeline from the through-hole of the fluid pipe, and the flow path-closing portion blocks an in-pipe flow path of the fluid pipe. A predetermined work step of performing a renewal and earthquake resistance work is executed in a state where the in-pipe flow path is blocked. Thereafter, a valve removal method of removing the flow path-closing device from the valve device in a state where the valve body is closed, and removing the valve device from the branch pipe in a state where the branch pipe is closed in a sealed manner is executed.

In the foregoing valve removal method, in the related art, as disclosed with reference to FIGS. 5 to 12 of JP-A-2014-109325, a closing piece (19) is inserted into a receiving portion (3) of a connection portion (22) corresponding to the connection port portion of the branch pipe, and an expansion member (48) made of a rubber material in the closing piece (19) is expanded to a closed state by an insertion device main body (58). In this closed state, the plug valve (16) and a case body (17) corresponding to the valve device are removed.

Thereafter, as disclosed with reference to FIG. 12 of JP-A-2014-109325, a pressing ring (95) which comes into contact with the closing piece (19) from a downstream side to prevent the pullout movement of the closing piece (19) is inserted into the receiving portion (3) of the connection portion (22). A flange portion (94) of the pressing ring (95) and a flange portion of the receiving portion (3) are fixed by bolts and nuts. Subsequently, a closing lid (97) which closes a central opening of the pressing ring (95) in a sealed state is fixed to the pressing ring (95) by bolts. A bolt (99) provided in a central portion of the closing lid (97) is screwed into a crimping bolt (50) of the closing piece (19), so that the closing piece (19) is pulled toward and fixed to the pressing ring (95).

The foregoing valve removal method requires a step of closing the inside of the receiving portion (3) of the connection portion (22) using the closing piece (19), a step of fixing and coupling the flange portion of the receiving portion (3) and the flange portion (94) of the pressing ring (95) to each other using the bolts and the nuts, a step of fixing the closing lid (97), which closes the central opening of the pressing ring (95) in a sealed state, to the pressing ring (95) using the bolts, and a step of screwing the bolt (99), which is provided in the central portion of the closing lid (97), onto the crimping bolt (50) of the closing piece (19) to pull and fix the closing piece (19) to the pressing ring (95), and it takes a long time to perform the valve removal method.

Moreover, in addition to the plug valve (16), the closing piece (19) that closes the inside of the receiving portion (3) of the connection portion (22) in a sealed manner, the pressing ring (95) that is fixed to the receiving portion (3) in a state where the pressing ring (95) comes into contact with the closing piece (19) to prevent the pullout movement of the closing piece (19), and the closing lid (97) including the bolt (99) that closes the central opening of the pressing ring (95) in a sealed manner and pulls and fixes the closing piece (19) to the pressing ring (95) are required, and the work costs of the valve removal method increase, which is a problem.

SUMMARY OF THE INVENTION

The present invention is made in light of the foregoing circumstances, and a main object of the present invention is to provide a valve removal method of a fluid pipeline structure, and a fluid pipeline structure and a valve device useful for the method, in which with rational improvement using a part of the valve device, unnecessary valve components of the valve device can be efficiently removed from the connection port portion of the pipe in a state where an opening of a connection port portion of a pipe is securely sealed, and work costs can be reduced by reducing the number of closing components.

According to a first aspect of the present invention, there is provided a valve removal method of a fluid pipeline structure, which removes an unnecessary portion of a valve device from a connection port portion side of a pipe without flow disruption in the fluid pipeline structure where the valve device including a valve body which is openable and closeable from a direction intersecting a flow path axis of a connection port portion is detachably provided on the connection port portion side of the pipe connected to a fluid piping system, the method including a valve body fixing step of fixing the valve body at a closed valve position to the connection port portion side in a sealed manner; and a valve component removing step of removing other unnecessary valve components of the valve device in a state where the valve body which is fixed in a sealed manner is left on the connection port portion side.

According to this configuration, when the valve device is removed from the pipe connected to the fluid piping system, the valve body fixing step is executed, so that the valve body at the closed valve position is fixed to the connection port portion of the pipe in a sealed manner. Subsequently, the valve component removing step is executed, so that while the valve body which is fixed to the connection port portion of the pipe in a sealed manner is left, other unnecessary valve components of the valve devices are removed from the connection port portion of the pipe.

Accordingly, since the valve body of the valve device can be used as it is, as a plug member for closing a pipe end which an opening of the connection port portion of the pipe is closed in a sealed manner, it is possible to eliminate a plurality of closing components such as a closing piece that closes the inside of the connection port portion of the pipe in a sealed manner and a closing lid including a pressing ring that is fixed to a receiving portion in a state where the pressing ring comes into contact with the closing piece to prevent the pullout movement of the closing piece and a bolt for closing a central opening of the pressing ring in a sealed manner and pulling and fixing the closing piece to the pressing ring, which are described in the method of the related art.

Moreover, since the valve body of the valve device is at the closed valve position where the opening of the connection port portion of the pipe is sealed, the execution of the valve body fixing step is completed only by fixing the valve body at the closed valve position as it is, to the connection port portion of the pipe.

Therefore, with the foregoing rational improvement using the valve body of the valve device, it is possible to efficiently remove an unnecessary valve component of the valve device from the connection port portion of the pipe in a state where the opening of the connection port portion of the pipe is securely sealed. Moreover, it is possible to reduce work costs by reducing the number of closing components.

According to a second aspect of the present invention, between a valve device mounting step of mounting the valve device on the connection port portion of the pipe and the valve body fixing step, a work equipment mounting step of mounting work equipment on the valve device, a predetermined work step of operating the valve body of the valve device to an open valve position and delivering a work portion of the work equipment into a work target region in a pipeline from an opening of the connection port portion to perform a predetermined work, and a work equipment removing step of taking the work portion out of the pipe after the predetermined work step is finished, operating the valve body to the closed valve position, and then removing the work equipment from the valve device are executed.

According to this configuration, the valve device mounted on the connection port portion of the pipe is generally used as a valve device for a predetermined work that delivers a work portion of a work equipment into a work target region in a pipeline to perform the predetermined work without flow disruption. For this reason, after the work equipment is removed from the valve device, an unnecessary portion of the valve device is removed from the connection port portion of the pipe.

In this case, as described above, while the valve body which is fixed at the closed valve position in a sealed manner is left on the connection port portion of the pipe, it is only necessary to remove other unnecessary valve components of the valve device from the connection port portion of the pipe; and thereby, it is possible to efficiently perform the work from the valve device mounting step to the valve component removing step through the work equipment mounting step, the predetermined work step, the equipment removing step, and the valve body fixing step.

According to a third aspect of the present invention, the valve body fixing step includes a valve body pressing step of pressing the valve body at the closed valve position against a connection end surface of the connection port portion in a sealed state using a valve body-pressing portion provided in a valve housing of the valve device, and a fastening and fixing step of fixing the valve body in a sealed state to the connection port portion side of the pipe using a first fastening portion.

According to this configuration, when the valve body fixing step of fixing the valve body of the valve device at the closed valve position to the connection port portion of the pipe in a sealed state is executed, in the valve body pressing step, the valve body at the closed valve position is securely pressed toward the connection end surface of the connection port portion against the fluid pressure by the valve body-pressing portion provided in the valve housing of the valve device, so that the sealed state can be maintained. The valve body can be securely and easily fixed to the connection port portion side of the pipe in a sealed state by the fastening and fixing step executed in this pressed state.

According to a fourth aspect of the present invention, the valve component removing step includes a step of removing a valve housing of the valve device, to which at least a part of a remaining portion of the valve device other than the valve body is integrally assembled, from the connection port portion side of the pipe.

According to this configuration, when other unnecessary valve components of the valve device are removed from the connection port portion of the pipe while the valve body which is fixed to the connection port portion of the pipe in a sealed manner is left, also the other unnecessary valve components which are integrally assembled to the valve housing can be simultaneously removed by detaching the valve housing from the connection port portion side of the pipe; and thereby, it is possible to efficiently and easily perform the work of removing the other valve components including the valve housing.

According to a fifth aspect of the present invention, there is provided a fluid pipeline structure which is used in the valve removal method of a fluid pipeline structure according to any one of the first to fourth aspects, in which a valve housing of the valve device is provided with an installation port portion that is externally mountable on a flange of the connection port portion of the pipe from a flow path axis direction in a detachable manner, and the valve body has a smaller external shape than that of the installation port portion of the valve housing, and includes a packing that comes into contact with a ring-shaped valve seat surface formed in a connection end surface of the connection port portion.

According to this configuration, since the valve body has a smaller external shape than that of the installation port portion of the valve housing, and is fixed at the closed valve position to the connection port portion of the pipe in a sealed manner, when the valve housing which is another unnecessary valve component is removed while the valve body is left at the closed valve position, it is possible to prevent the valve body from being caught by a peripheral edge of the installation port portion of the valve housing. Accordingly, it is possible to smoothly pull out the valve housing along the flow path axis direction, and it is possible to efficiently and easily perform the work of removing other unnecessary valve components.

According to a sixth aspect of the present invention, the pipe is provided with a load receiving portion which protrudes further outward in a radial direction than an outer peripheral surface of the flange of the connection port portion and on which the installation port portion of the valve housing is placed and supported, so as to be detachable, and in a state where the installation port portion of the valve housing is placed and supported on the load receiving portion, a sliding guide surface inside the valve housing, which guides sliding of the packing of the valve body, and the ring-shaped valve seat surface of the connection port portion are disposed at the same or substantially the same height position.

According to this configuration, when the installation port portion of the valve housing is placed and supported on the load receiving portion that protrudes further outward in the radial direction than the outer peripheral surface of the flange of the connection port portion, the sliding guide surface inside the valve housing, which guides the sliding of the packing of the valve body, and the ring-shaped valve seat surface of the connection port portion are at the same or substantially the same height position; and thereby, it is possible to smoothly perform the opening and closing operation of the valve body. Moreover, since the load receiving portion is configured to be attachable to and detachable from the pipe, it is not required that a large pipe is remade as when the load receiving portion is formed integrally with the flange of the connection port portion; and thereby, it is possible to securely and easily install the valve housing on the flange of the existing pipe while reducing the initial investment.

According to a seventh aspect of the present invention, a hole closing tool including a sealing and closing portion which closes a coupling hole of the flange in a sealed state is detachably mounted between a pipe main body including the pipe and the flange, and the hole closing tool is provided with the load receiving portion.

According to this configuration, the installation port portion of the valve housing is externally mounted on the flange of the connection port portion of the pipe, and the hole closing tool is mounted between the pipe main body including the pipe and the flange; and thereby, the coupling hole of the flange can be securely closed in a sealed state by the sealing and closing portion of the hole closing tool. Accordingly, when the valve body is at the open valve position, it is possible to prevent the fluid from leaking outside from the coupling hole of the flange. Moreover, since the load receiving portion on which the installation port portion of the valve housing is placed and supported is provided using the hole closing tool, it is possible to simplify the mounting structure where the load receiving portion is detachably provided, and reduce the costs.

According to an eighth aspect of the present invention, inside the valve housing of the valve device, a rotary arm which is rotationally operable around an axis parallel to or substantially parallel to a flow path axis of the connection port portion of the pipe is provided and a linkage mechanism which causes the valve body to reciprocate between a closed valve position and an open valve position in conjunction with a rotation of the rotary arm is provided, and the linkage mechanism is configured to be changeable between a linked state and a non-linked state in the flow path axis direction and to be changed to the non-linked state as the valve housing moves along the flow path axis direction to separate from the valve body fixed to the connection port portion side.

According to this configuration, the rotary motion of the rotary arm provided inside the valve housing of the valve device is changed to the reciprocating motion of the valve body by the linkage mechanism. For this reason, for example, compared to when the valve body is coupled to the tip of the operating member penetrating through the valve housing and the push and pull operation of the operating member causes the valve body to reciprocate between the closed valve position and the open valve position, it is possible to reduce the size of the valve device by an amount corresponding to a protrusion of the operating member. Accordingly, it is possible to advantageously excavate a work pit for an underground piping.

Moreover, the linkage mechanism which links the rotary arm and the valve body is configured to be changeable between the linked state and the non-linked state in the flow path axis direction. For this reason, when the valve housing which is another unnecessary valve component is removed while the valve body which is fixed to the connection port portion of the pipe in a sealed manner is left, an operation of decoupling the linkage mechanism is not required. Accordingly, since it is only necessary to pull out the valve housing along the flow path axis direction, it is possible to efficiently and easily perform the work of removing other unnecessary valve components.

According to a ninth aspect of the present invention, a linear guide portion which guides the valve body to move in a non-rotatable state between a closed valve position and an open valve position in a linear direction is provided on an inner surface side of the valve housing.

According to this configuration, the movement of the valve body between the closed valve position and the open valve position in the linear direction can be smoothly guided along the linear guide portion provided on the inner surface side of the valve housing. Moreover, in this case, since the orientation of the valve body is not changed, the valve body operated to the closed valve position can be easily fixed to the connection port portion of the pipe in a sealed manner.

According to a tenth aspect of the present invention, there is provided a valve device which is used in the fluid pipeline structure according to any one of the fifth to ninth aspects, in which the valve body includes a packing that comes into contact with a ring-shaped valve seat surface formed in a connection end surface of the connection port portion, and a mounting hole for fixing a bolt to a flange of the connection port portion.

According to this configuration, the valve body of the valve device can be used as it is, as a plug member for closing a pipe end which closes the opening of the connection port portion of the pipe in a sealed manner. Accordingly, it is possible to efficiently remove an unnecessary valve component of the valve device from the connection port portion of the pipe in a state where the opening of the connection port portion of the pipe is securely sealed. Moreover, it is possible to reduce work costs by reducing the number of closing components.

BRIEF DESCRIPTION OF DRAWINGS

FIGS. 22(a)-22(b) are sectional views during the work of fixing the valve body.

DESCRIPTION OF THE INVENTION

Embodiments of the present invention will be described based on the drawings.

First Embodiment

Figure 1:
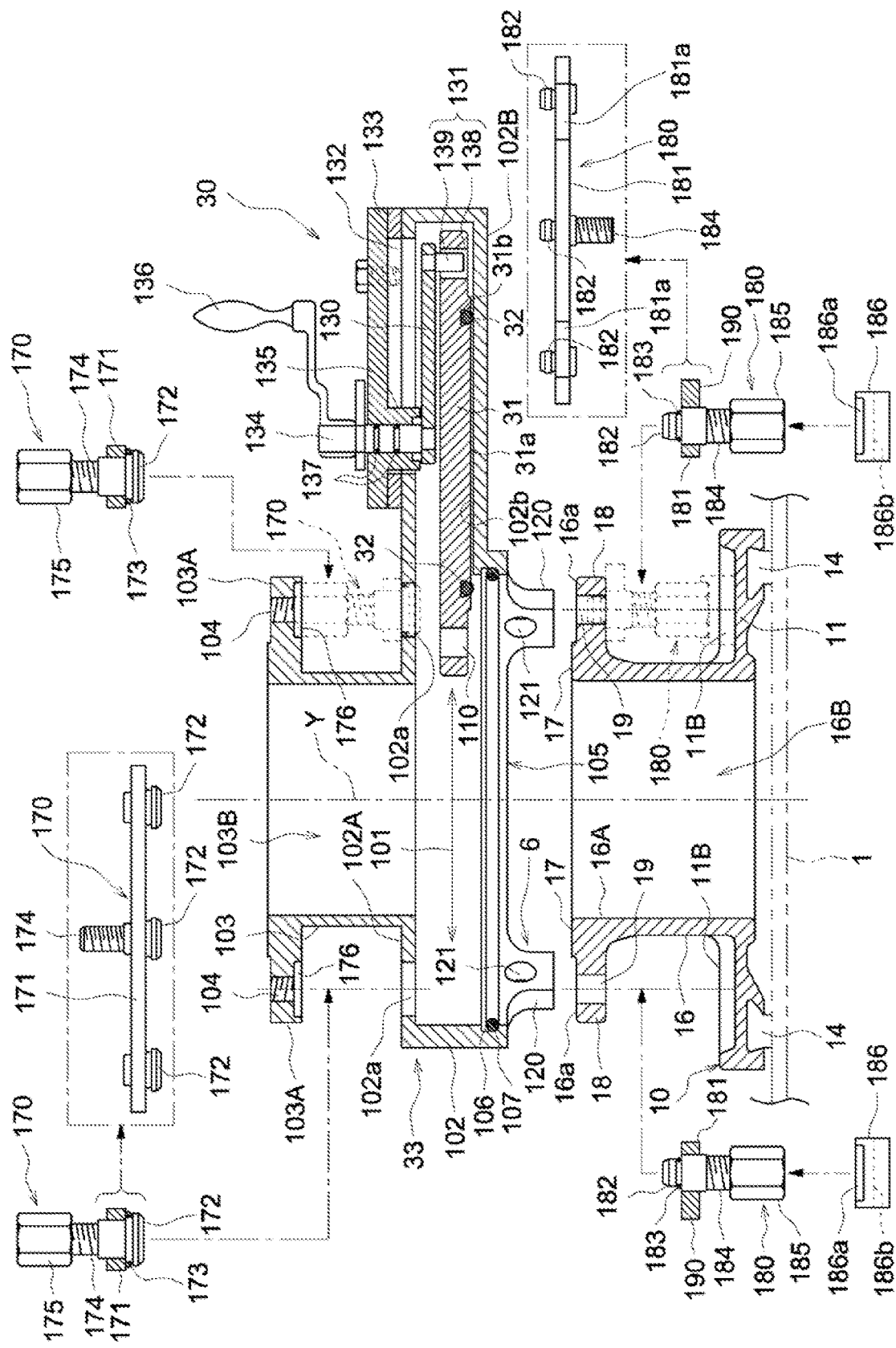
FIG. 1 is an exploded sectional view of a valve device according to a first embodiment.
Figure 2:
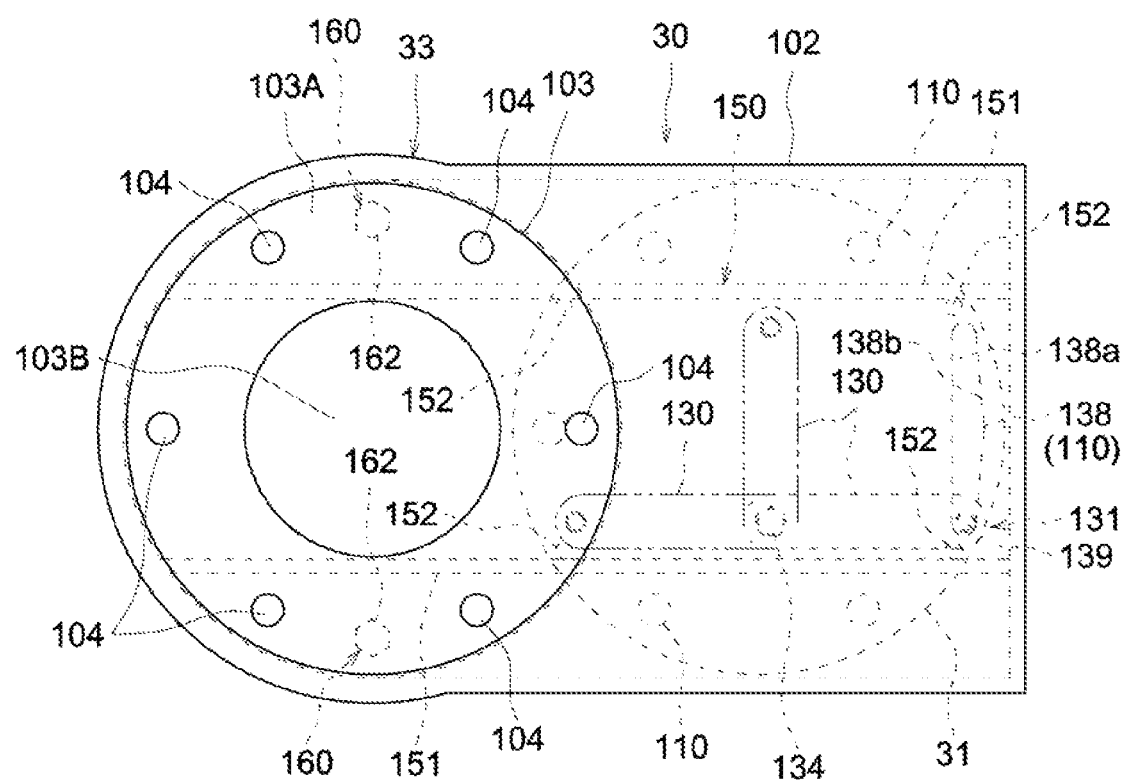
FIG. 2 is a plan view of the valve device.
Figure 4:
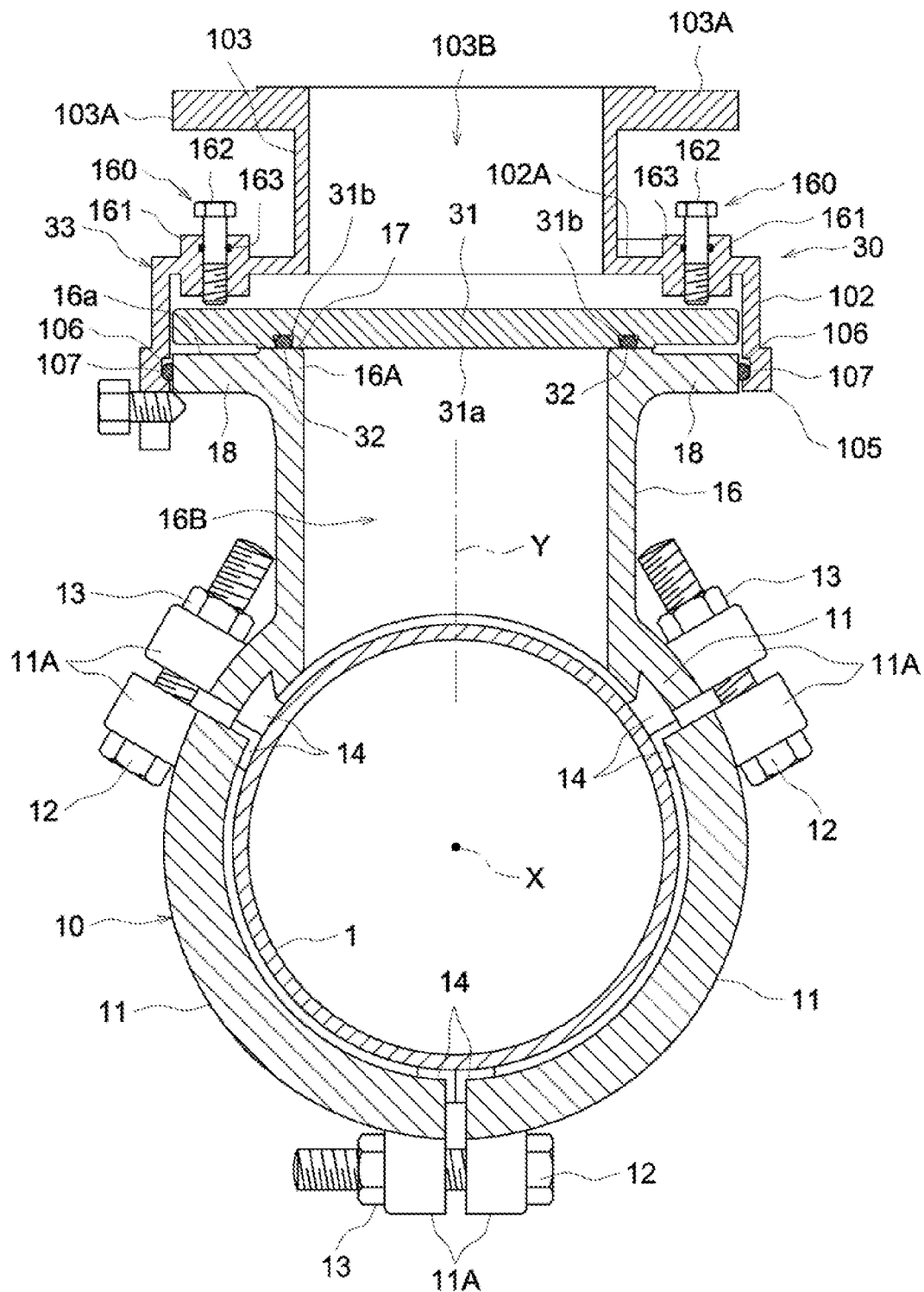
FIG. 4 is a transverse sectional view when the split T-shaped pipe and the valve device are assembled to the fluid pipe.

FIGS. 1 and 2 illustrate a valve device 30 that is attachable to and detachable from a connection port portion 16A of a pipe 16 connected to a fluid piping system illustrated in FIG. 4. In a valve housing 33, the valve device 30 includes a valve body 31 that is openable and closeable in a direction orthogonal to (one example of an intersecting direction) a flow path axis (branch axis) of the connection port portion 16A.

For example, when a renewal of or an earthquake resistance work on a pipeline forming the fluid piping system is started, the valve device 30 is mounted on the connection port portion 16A of the pipe 16, which forms a part of the pipeline, in a sealed state (watertight state), and when the renewal or the earthquake resistance work is finished, without flow disruption (without water disruption), the valve device 30 is removed from the connection port portion 16A of the pipe 16. For this reason, the valve device 30 has a function and a structure that are useful in executing a valve removal method.

In addition, as the pipe 16 on which the valve device 30 is mounted, there are various forms of pipes in the related art. For example, in the embodiment, as illustrated in FIG. 4, as an example of the pipe 16, there is provided a branch pipe (hereinafter, referred to as a branch pipe 16) of a split T-shaped pipe (one example of a pipe main body) 10 that has a split structure and is externally mounted and fixed on a fluid pipe (water pipe) 1 in a sealed state (hereinafter, may be referred to as a watertight state). Besides, examples of the pipe 16 can include a branch pipe that integrally protrudes from a pipe wall of the fluid pipe, a pipe forming a part of a fluid machine, and the like which are not illustrated.

Furthermore, the fluid pipe 1 of this embodiment is a ductile cast iron pipe forming a water pipe that transports tap water (drinking water) which is one example of a fluid; however, other cast iron pipes, steel pipes, resin pipes, or the like can be used as the fluid pipe 1. In addition, examples of the fluid include industrial water, gas such as manufactured gas, or the like in addition to tap water.

As illustrated in FIG. 4, the split T-shaped pipe 10 used in this embodiment includes three split couplers 11 of which each has a partial cylindrical shape and which are split in a pipe circumferential direction and are externally mountable on the fluid pipe 1 from a pipe radial direction. Among coupling flange portion 11A which are formed in both end portions of the split couplers 11 in the pipe circumferential direction, the coupling flange portions 11A adjacent to each other in the pipe circumferential direction are detachably fixed and coupled to each other by a plurality of sets of bolts 12 and nuts 13 which are one example of fastening means.

In addition, a seal member 14 made of rubber is installed on inner surfaces of the split couplers 11 to seal a gap between the inner surfaces thereof and an outer peripheral surface of the fluid pipe 1 and a gap between split surfaces of both split couplers 11 adjacent to each other in the circumferential direction in a watertight state. The branch pipe 16 having a cylindrical shape integrally protrudes from a central portion in the pipe circumferential direction and a central portion in a pipe axis direction in one split coupler 11 that is disposed above an upper portion of the fluid pipe 1. A branch flow path 16B in the branch pipe 16 opens upward along a branch axis (flow path axis) Y orthogonal to a pipe axis X of the fluid pipe 1.

As illustrated in FIGS. 1 and 4, a ring-shaped valve seat surface 17 which has an annular shape and with which a first packing 32 of the valve body 31 of the valve device 30 comes into watertight contact protrudes from a connection end surface 16a of the connection port portion 16A of the branch pipe 16.

In addition, as illustrated in FIGS. 1 and 4, a first flange 18 having an annular shape and protruding outward in the pipe radial direction is integrally formed on an outer peripheral surface of the connection port portion 16A of the branch pipe 16. As illustrated in FIG. 1, first bolt insertion holes 19 serving as coupling holes penetrate through the first flange 18 at a plurality of locations (six locations in this embodiment) in a circumferential direction of the first flange 18.

Subsequently, the valve device 30 will be described in detail.

As illustrated in FIGS. 1 to 4, the valve housing 33 of the valve device 30 includes a housing main body 102 made of metal and having a valve movement passage 101 which accommodates the valve body 31 having a plate shape and made of metal such that the valve body 31 is movable between a closed valve position and an open valve position, and a coupling cylinder portion 103 made of metal and extending to a top plate 102A of the housing main body 102 in a state where the coupling cylinder portion 103 is coaxial with the branch pipe 16. An internal flow path 103B of the coupling cylinder portion 103 has the same inner diameter as that of the branch flow path 16B in the branch pipe 16. In addition, a second flange 103A to which work equipment 70 or piping equipment is detachably coupled in a watertight state extends from an upper end portion of the coupling cylinder portion 103. Examples of the work equipment 70 coupled to the second flange 103A of the coupling cylinder portion 103 include a drilling device 80 illustrated in FIGS. 6 and 7 (refer to FIGS. 18 and 19), a flow path-closing device 90 illustrated in FIG. 8 (refer to FIG. 20), and the like.

The second flange 103A of the coupling cylinder portion 103 has the same outer diameter as that of the first flange 18, and coupling screw holes 104 serving as coupling holes are formed in the second flange 103A at a plurality of locations (six locations in this embodiment) in a circumferential direction of the second flange 103A. The first bolt insertion holes 19 of the first flange 18 and the coupling screw holes 104 of the second flange 103A are formed with the same pitch at the same phase positions.

An installation port portion 105 which is externally mountable on the first flange 18 of the branch pipe 16 from a branch axis Y direction in a detachable manner is formed in a bottom plate 102B of the housing main body 102. A seal installation groove 106 having an annular shape is formed in an inner peripheral surface of the installation port portion 105, and a seal member 107 such as an O-ring is installed in the seal installation groove 106 to seal a gap between facing surfaces of the inner peripheral surface of the installation port portion 105 and an outer peripheral surface of the first flange 18 in a watertight state.

The outer diameter of the valve body 31 is the same or substantially the same as the outer diameter of the first flange 18, and is slightly smaller than the inner diameter of the inner peripheral surface of the installation port portion 105 of the housing main body 102. A packing installation groove 31b, which has an annular shape and opens downward toward the ring-shaped valve seat surface 17 at the closed valve position where a flow path opening of the branch pipe 16 is blocked, is formed in a flow path-blocking surface 31a that corresponds to a lower surface side of the valve body 31. The first packing 32 is installed in the packing installation groove 31b.

Mounting holes 110 are formed in portions of the valve body 31 at a plurality of locations (six locations in this embodiment) in a circumferential direction of the valve body 31, the portions corresponding to the first bolt insertion holes 19 of the first flange 18 at the closed valve position. The mounting holes 110 of the valve body 31 and the first bolt insertion holes 19 of the first flange 18 are disposed with the same pitch at the same phase positions.

Figure 11:
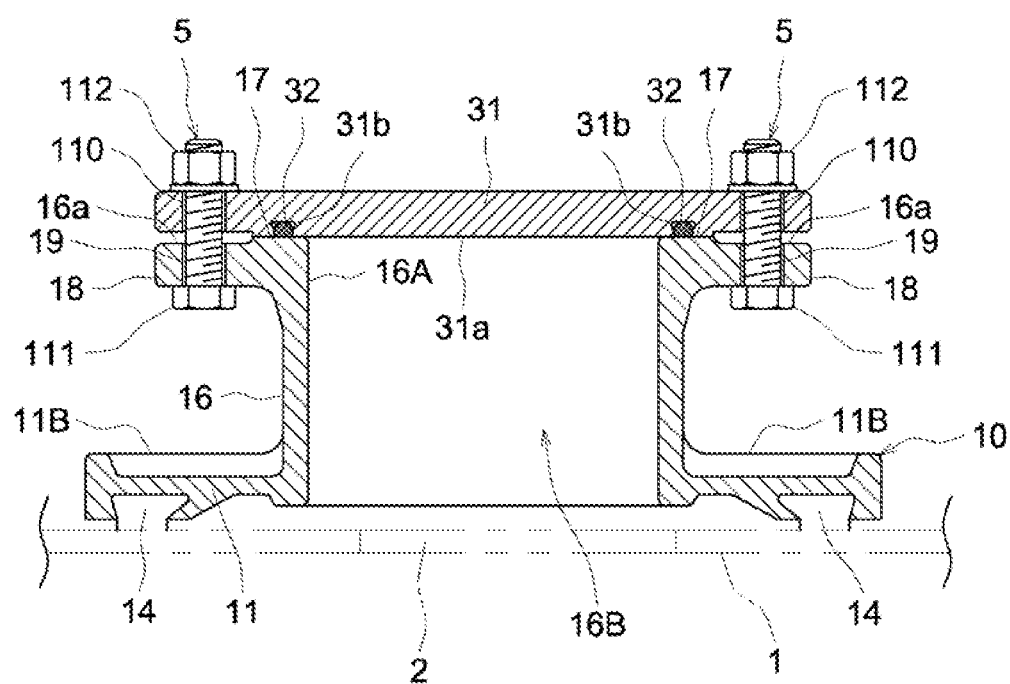
FIG. 11 is a sectional view when other valve components of the valve device are removed while the valve body is left.

As illustrated in FIG. 11, the mounting holes 110 of the valve body 31 at the closed valve position and the first bolt insertion holes 19 of the first flange 18 can be watertightly fixed and coupled to each other by bolts 111 and nuts 112 that form a first fastening portion 5 for the fixation of the valve.

Figure 9:
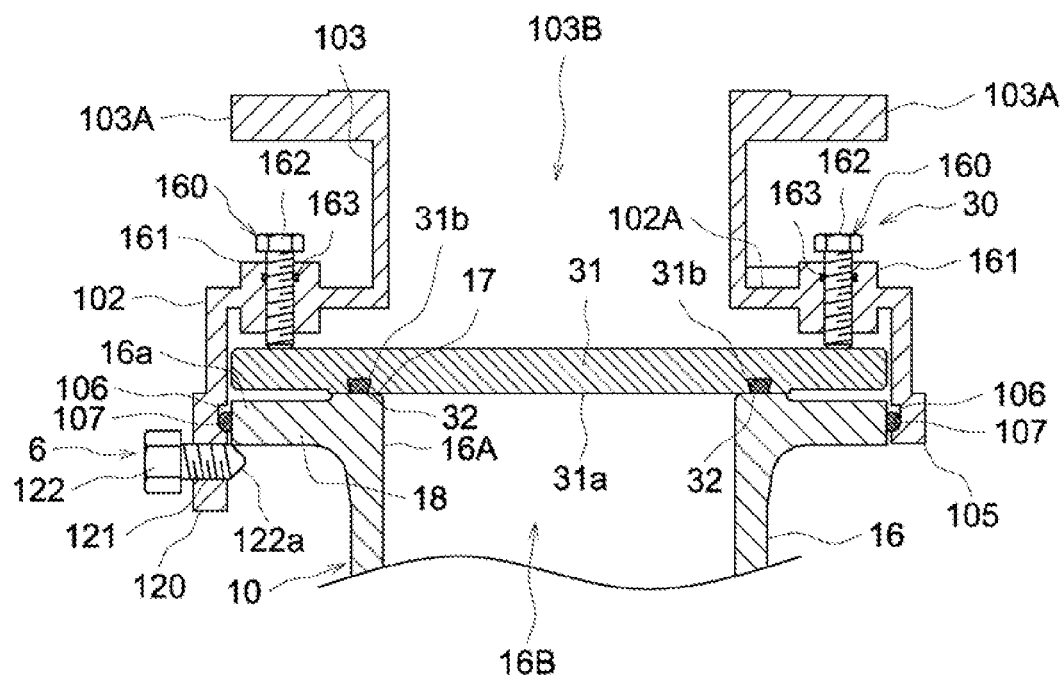
FIG. 9 is a sectional view illustrating a pressed state of the valve body at a closed valve position.

As illustrated in FIGS. 1 and 9, mounting pieces 120 which protrude further downward than a lower surface of the first flange 18 of the branch pipe 16 are formed in the installation port portion 105 of the housing main body 102 at a plurality of locations (four locations in this embodiment) in a circumferential direction of the installation port portion 105. A screw hole 121 having a screw axis at a height position that is slightly deviated below the lower surface of the first flange 18 of the branch pipe 16 penetrates through each of the mounting pieces 120. A pulling bolt 122 including a tapered surface 122a which comes into contact with an outer peripheral edge on a lower surface side of the first flange 18 from outward in the radial direction is detachably screwed into each of the screw holes 121.

As illustrated in FIGS. 2, 4, and 9, the screw holes 121 which are formed in a plurality of the mounting pieces 120 of the installation port portion 105 of the housing main body 102, and the pulling bolts 122 which are screwed into the screw holes 121 form a second fastening portion 6 by which the valve housing 33 of the valve device 30 is pulled toward and fixed to the first flange 18 of the branch pipe 16 in a watertight state.

Inside the housing main body 102, a rotary arm 130 which is rotationally operable around an axis parallel to or substantially parallel to the flow path axis of the connection port portion 16A of the branch pipe 16 is disposed, and a linkage mechanism 131 which causes the valve body 31 to reciprocate between the closed valve position and the open valve position in conjunction with the rotation of the rotary arm 130 is provided. The linkage mechanism 131 can be changed between a linked state and a non-linked state in the branch axis Y direction, and is configured to be changed to the non-linked state as the valve housing 33 moves in the branch axis Y direction to separate from (remove from) the valve body 31 fixed to the connection port portion 16A of the branch pipe 16.

Subsequently, a specific configuration of the switching operation portion of the valve body 31 will be described.

Figure 3:
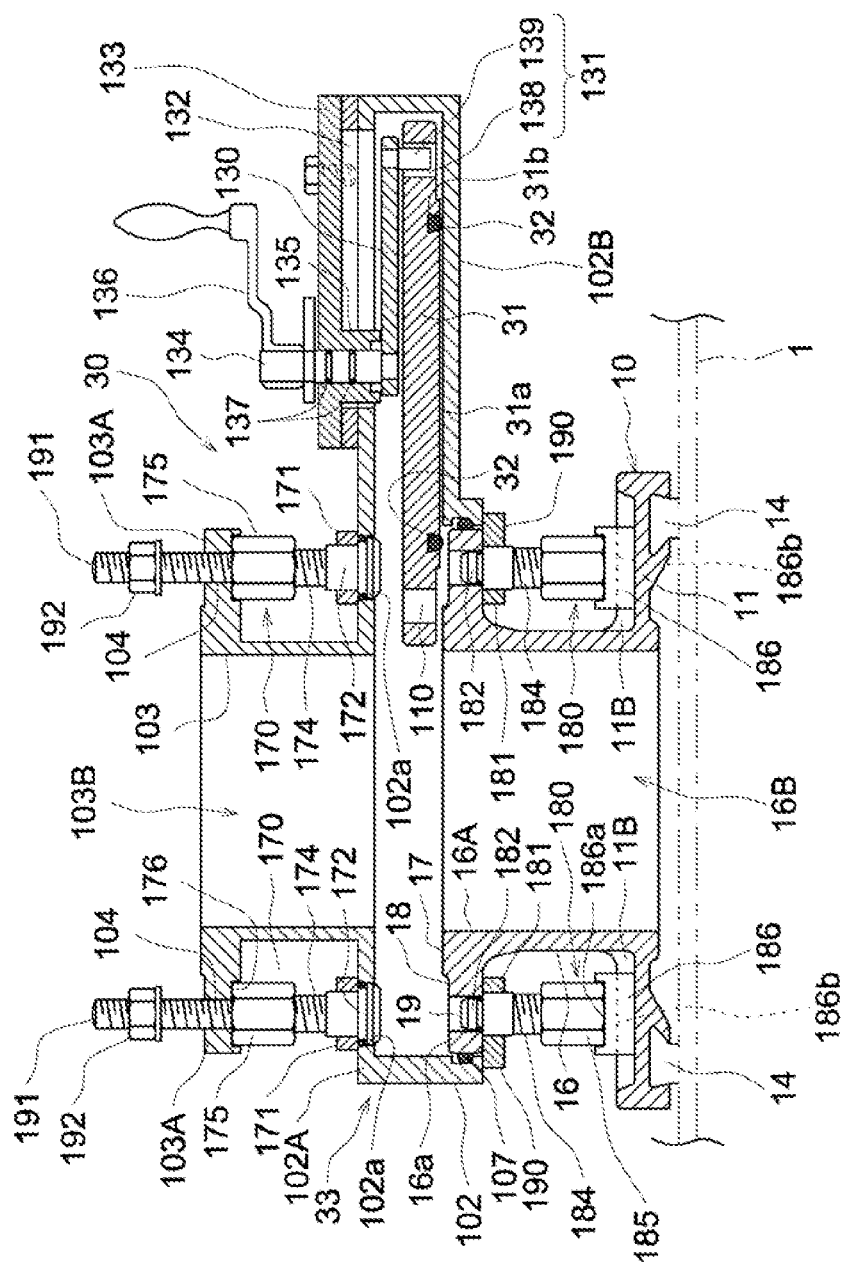
FIG. 3 is a longitudinal sectional view when a split T-shaped pipe and the valve device are assembled to a fluid pipe.

As illustrated in FIGS. 1 to 3, an opening 132 through which the rotary arm 130 can be inserted into and disposed in the valve movement passage 101 is formed in the top plate 102A of the housing main body 102. A lid plate 133 which closes the opening 132 is provided with a boss portion 135 that rotatably supports a rotary shaft 134 in a state where the rotary shaft 134 parallel to or substantially parallel to the flow path axis of the connection port portion 16A penetrates through the boss portion 135. A base end portion of the rotary arm 130 is fixed to a lower end shaft portion of the rotary shaft 134 supported by the boss portion 135, and a handle 136 is installed on an upper end shaft portion of the rotary shaft 134. In addition, seal members 137 such as O-rings are installed in ring-shaped seal installation grooves, which are formed in an intermediate shaft portion of the rotary shaft 134 at two locations, to seal a gap between the intermediate shaft portion and an inner peripheral surface of the boss portion 135 in a watertight state.

The linkage mechanism 131 includes an elongated hole 138 that is formed in a base end portion of the valve body 31 on an upstream side in a valve closing direction (end portion that is spaced apart from the flow path opening of the branch pipe 16), and an engagement protrusion 139 that is provided in a tip portion of the rotary arm 130. The engagement protrusion 139 of the rotary arm 130 is configured to be able to engage with the elongated hole 138 of the valve body 31 from above and disengage therefrom. For this reason, as the valve housing 33 moves upward to separate from the valve body 31 fixed to the connection port portion 16A of the branch pipe 16, the engagement protrusion 139 of the rotary arm 130 assembled to the valve housing 33 is pulled upward out from the elongated hole 138 of the valve body 31. Accordingly, the state of connection between the engagement protrusion 139 of the rotary arm 130 and the elongated hole 138 of the valve body 31 is changed from a linked state to a non-linked state.

As illustrated in FIG. 2, the elongated hole 138 of the valve body 31 is formed along a direction orthogonal to a valve movement direction (valve passage width direction of the valve movement passage 101), and the central position of the elongated hole 138 in a longitudinal direction of the elongated hole 138 is also used as that of the mounting hole 110 into which the bolt 111 of the first fastening portion 5 is inserted, the bolt 111 having a larger diameter than that of the engagement protrusion 139. For this reason, as illustrated in FIG. 2, of both inner surfaces 138a and 138b of the elongated hole 138 in the valve movement direction, the inner surface 138b which is positioned outward in the radial direction of the valve body 31 is curved into a flat "V" shape where the inner surface 138b stretches outward as a central position side of the elongated hole 138 in the longitudinal direction is approached. In addition, the lid plate 133 is detachably fixed to a peripheral edge of the opening 132 in the top plate 102A of the housing main body 102 in a watertight state by bolts.

Figure 5:
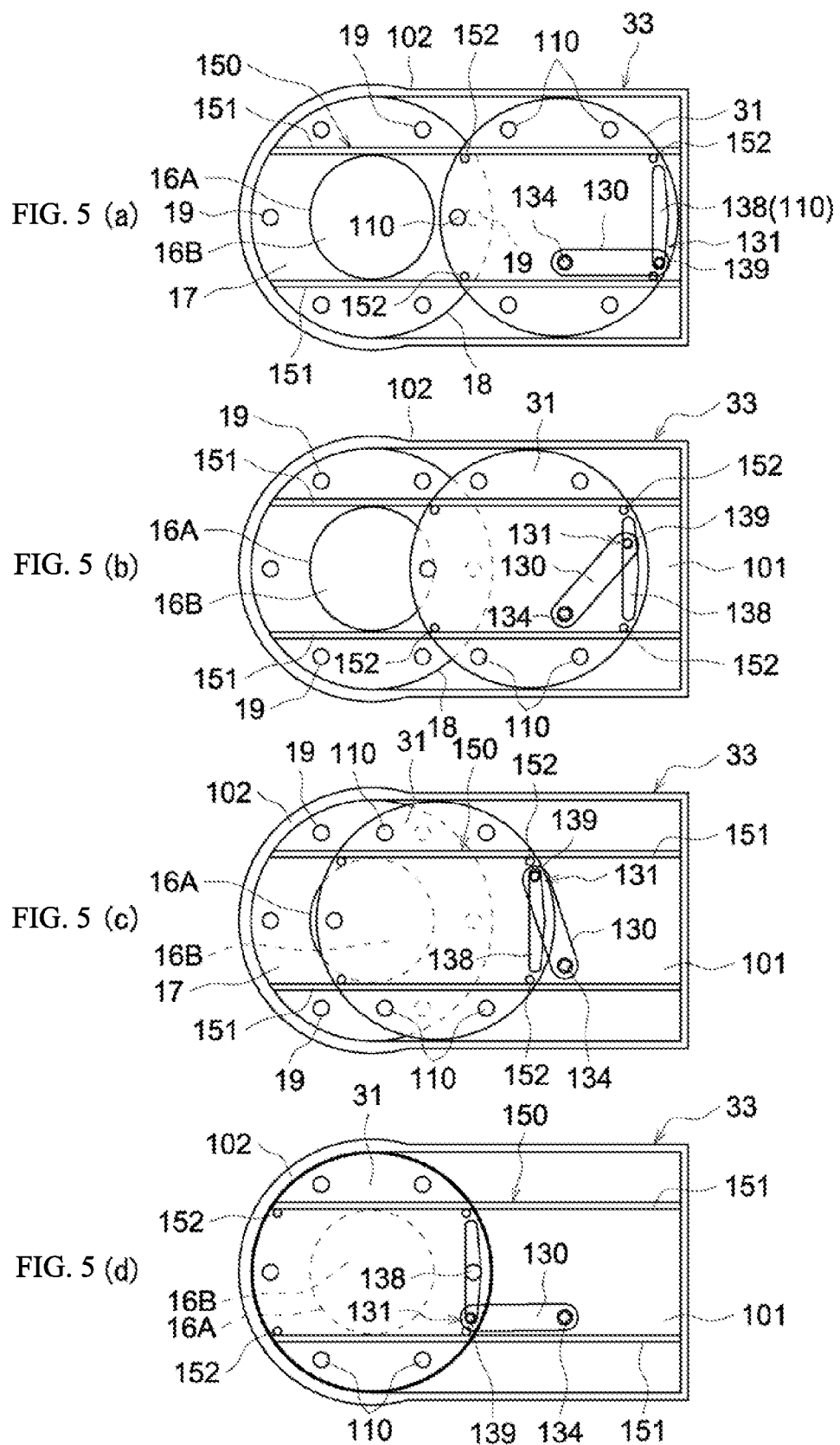
FIGS. 5(a)-5(d) are views describing the operation of a valve body of the valve device.

As illustrated in FIGS. 2 and 5, a linear guide portion 150 which guides the valve body 31 to move in a non-rotatable state between the closed valve position and the open valve position in a linear direction is provided on an inner surface side of the valve housing 33. The linear guide portion 150 includes a pair of guide rails 151 along the valve movement direction which are firmly fixed to an inner surface of the top plate 102A of the housing main body 102, and guide pins 152 that are provided on an upper surface of the valve body 31 in a state where the guide pins 152 are slidably in contact with both guide rails 151. The interval between the both guide rails 151 in the valve passage width direction is larger than the inner diameter of the installation port portion 105 of the housing main body 102, and is smaller than the interval between both mounting holes 110 that face each other in the valve passage width direction. In addition, a region between the both guide rails 151 is formed as an operation space of the rotary arm 130.

The guide pins 152 are provided at a total of four locations, namely, in both side portions of a tip portion of the valve body 31 in the valve passage width direction and both side portions of the base end portion of the valve body 31 in the valve passage width direction. In a state where the rotation of the valve body 31 is prevented, the valve body 31 is guided to move in the linear direction by slide contact between the guide pins 152 and the both guide rails 151.

As illustrated in FIGS. 2 and 4, the housing main body 102 is provided with a valve body-pressing portion 160 that presses the first packing 32 of the valve body 31 at the closed valve position against the ring-shaped valve seat surface 17 of the connection port portion 16A of the branch pipe 16 in a watertight state. The valve body-pressing portion 160 includes female screw members 161 that are firmly fixed to both side portions in the top plate 102A of the housing main body 102 with respect to a center line in the valve passage width direction, the center line passing through the flow path axis of the connection port portion 16A, in a state where the female screw members 161 penetrate through the both side portions, and push bolts 162 which can be screwed into the female screw members 161 from above and of which each has a length to be able to press the upper surface of the valve body 31 at the closed valve position.

A seal member 163 such as an O-ring is installed on an inner peripheral surface of each of the female screw members 161 to seal a gap between the inner peripheral surface and an outer peripheral surface of the push bolt 162 in a watertight state.

As illustrated in FIGS. 1 and 3, bolt insertion holes 102a through which the bolts 111 of the first fastening portion 5 for fixing the valve are inserted into the housing main body 102 are formed in portions of the top plate 102A of the housing main body 102 along the circumferential direction, the portions corresponding to the mounting holes 110 of the valve body 31 at the closed valve position, while penetrating through the portions. When the valve body 31 is not fixed to the first flange 18, a first hole closing tool 170 which has a split structure and closes all of the bolt insertion holes 102a in a watertight state so as to prevent the fluid from flowing out from the bolt insertion holes 102a is detachably mounted on the valve housing 33.

As illustrated in FIGS. 1 and 3, the first hole closing tool 170 includes a pair of first closing support plates 171 of which each has a semi-annular shape and which can be disposed along the bolt insertion holes 102a of the top plate 102A of the housing main body 102. First plug members 172 that are detachably fitted into a plurality of (three in this embodiment) of the bolt insertion holes 102a from above which are positioned in a semi-circular region are firmly fixed to each of the both first closing support plates 171. A seal member 173 such as an O-ring is installed on each of the first plug members 172 to seal a gap between the first plug member 172 and an inner peripheral surface of the bolt insertion hole 102a in a watertight state. The first plug member 172 on which the seal member 173 is installed forms a sealing and closing portion that closes the bolt insertion hole 102a of the top plate 102A of the housing main body 102 in a watertight state.

As illustrated in FIG. 1, a first screw shaft 174 protruding upward is formed in the first plug member 172 that is disposed in a central portion of each of the first closing support plates 171 in a semi-circumferential direction. A first long nut 175 having a hexagonal shape and capable of coming into contact with a lower surface of the second flange 103A of the coupling cylinder portion 103 is screwed onto the first screw shaft 174. A first positioning recess 176 which has a circular shape and into which an upper end portion of the first long nut 175 is rotatably fitted is formed in the lower surface of the second flange 103A of the coupling cylinder portion 103.

Then, when the first hole closing tool 170 is mounted, the first plug members 172 of the first closing support plate 171 are disposed at positions immediately above the bolt insertion holes 102a of the top plate 102A of the housing main body 102. In addition, the upper end portion of the first long nut 175 which is screwed onto the first screw shaft 174 of the first plug member 172 positioned in the central portion is fitted and disposed in the first positioning recess 176 of the lower surface of the second flange 103A of the coupling cylinder portion 103. In this state, when the first long nut 175 is rotationally operated to a tension side where the distance between the first long nut 175 and the first closing support plate 171 increases, the seal member 173 installed on each of the first plug members 172 is press-fitted into the bolt insertion hole 102a, so that the bolt insertion hole 102a is closed in a watertight state. When the first long nut 175 is further rotationally operated to the tension side, the first closing support plate 171 is pressed against the upper surface of the top plate 102A of the housing main body 102, and the first hole closing tool 170 is fixed in a tension state between the lower surface of the second flange 103A of the coupling cylinder portion 103 and the upper surface of the top plate 102A of the housing main body 102.

As illustrated in FIGS. 1 and 3, when the valve body 31 is not fixed to the first flange 18 of the branch pipe 16, a second hole closing tool 180 which has a split structure and closes all of the first bolt insertion holes 19 in a watertight state so as to prevent the fluid from flowing out from the first bolt insertion holes 19 of the first flange 18 is detachably mounted on the split T-shaped pipe 10.

As illustrated in FIGS. 1 and 3, the second hole closing tool 180 includes a pair of second closing support plates 181 of which each has a semi-annular shape and which can be disposed along the first bolt insertion holes 19 of the first flange 18. Second plug members 182 that are detachably fitted into a plurality of (three in this embodiment) of the first bolt insertion holes 19 from below which are positioned in a semi-circular region are firmly fixed to each of the both second closing support plates 181. A seal member 183 such as an O-ring is installed on each of the second plug members 182 to seal a gap between the second plug member 182 and an inner peripheral surface of the first bolt insertion hole 19 in a watertight. The second plug member 182 on which the seal member 183 is installed forms a sealing and closing portion that closes the first bolt insertion hole 19 of the first flange 18 in a watertight state.

As illustrated in FIG. 1, a second screw shaft 184 protruding downward is formed in the second plug member 182 that is disposed in a central portion of each of the second closing support plates 181 in a semi-circumferential direction. A second long nut 185 having a hexagonal shape and capable of coming into contact with a top side of the split coupler 11 positioned uppermost is screwed onto the second screw shaft 184. A lower end portion of the second long nut 185 is disposed above the top of the split coupler 11 positioned uppermost with a support base 186 interposed therebetween. As illustrated in FIGS. 1 and 3, a second positioning recess 186a which has a circular shape and into which the lower end portion of the second long nut 185 is rotatably fitted is formed in an upper surface of the support base 186. A recess 186b that is fitted on a rib 11B from above which is formed at the top of the split coupler 11 along the pipe axis direction is formed in a lower surface of the support base 186.

Then, when the second hole closing tool 180 is mounted, the second plug members 182 of the second closing support plate 181 are disposed at positions immediately below the first bolt insertion holes 19 of the first flange 18. In addition, the lower end portion of the second long nut 185 which is screwed onto the second screw shaft 184 of the second plug member 182 positioned in the central portion is fitted and disposed in the second positioning recess 186a of the support base 186 that is fitted and installed on the rib 11B of the split coupler 11. In this state, when the second long nut 185 is rotationally operated to a tension side where the distance between the second long nut 185 and the second closing support plate 181 increases, the seal member 183 installed on each of the second plug members 182 is press-fitted into the first bolt insertion hole 19, so that the first bolt insertion hole 19 is closed in a watertight state.

When the second long nut 185 is further rotationally operated to the tension side, the second closing support plate 181 is pressed against the lower surface of the first flange 18, and the second hole closing tool 180 is fixed in a tension state between the lower surface of the first flange 18 of the branch pipe 16 and the top of the split coupler 11 positioned uppermost.

The outer diameter of an outer peripheral side surface of each of the both the second closing support plates 181 is larger than the outer diameter of the first flange 18. Protrusion portions of the both second closing support plates 181 which protrude further outward in the radial direction than the outer peripheral surface of the first flange 18 form a load receiving portion 190 on which a lower end surface of the installation port portion 105 of the valve housing 33 is placed and supported. Then, in a state where the lower end surface of the installation port portion 105 of the valve housing 33 is placed and supported on the load receiving portion 190, a sliding guide surface 102b which corresponds to an inner surface side of the bottom plate 102B of the housing main body 102 and guides the sliding of the first packing 32 of the valve body 31, and the ring-shaped valve seat surface 17 of the connection port portion 16A on which the first packing 32 of the valve body 31 slides are disposed at the same or substantially the same height position.

In addition, as illustrated in FIG. 1, when the lower end surface of the installation port portion 105 of the valve housing 33 is placed and supported on the load receiving portion 190 of the both second closing support plates 181, cutout portions 181a of which each has the shape of a recess and through which the plurality of mounting pieces 120 of the installation port portion 105 of the housing main body 102 pass are formed in the both second closing support plates 181. The tapered surface 122a of the pulling bolt 122 screwed into the screw hole 121 of the mounting piece 120 engages with the outer peripheral edge on the lower surface side of the first flange 18 which is present in the cutout portions 181a of the both second closing support plates 181.

Figure 6:
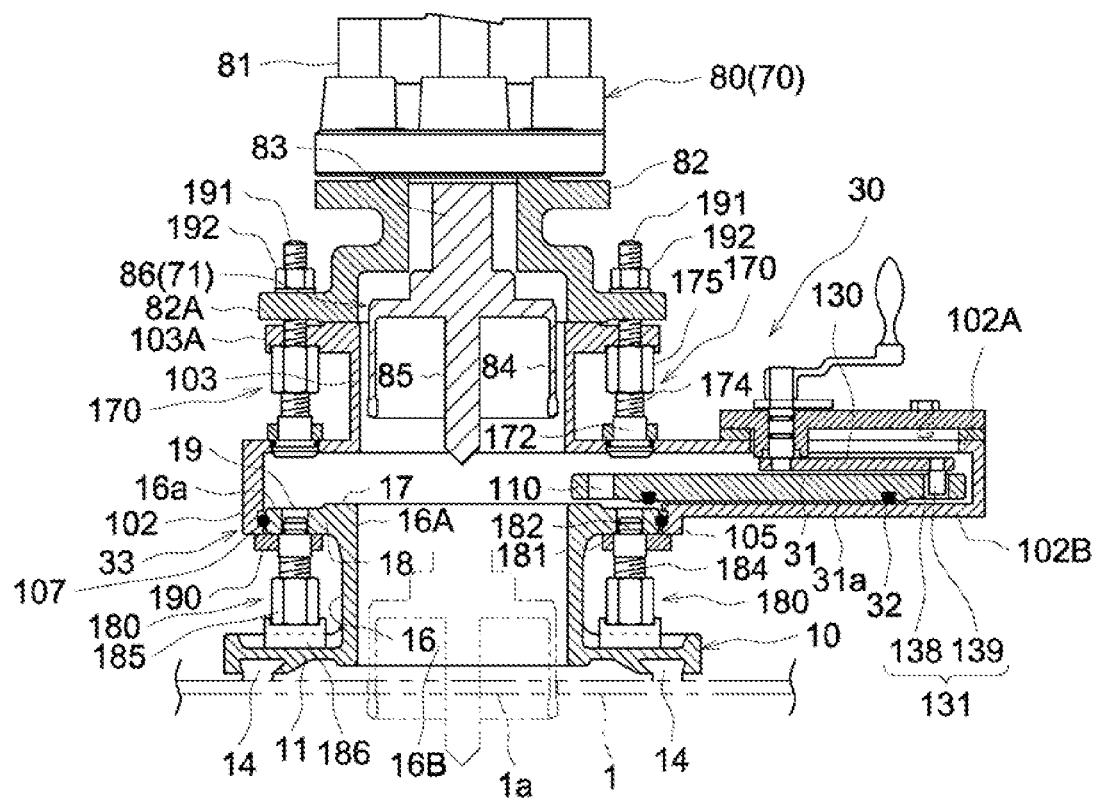
FIG. 6 is a sectional view when a drilling work is started.
Figure 7:
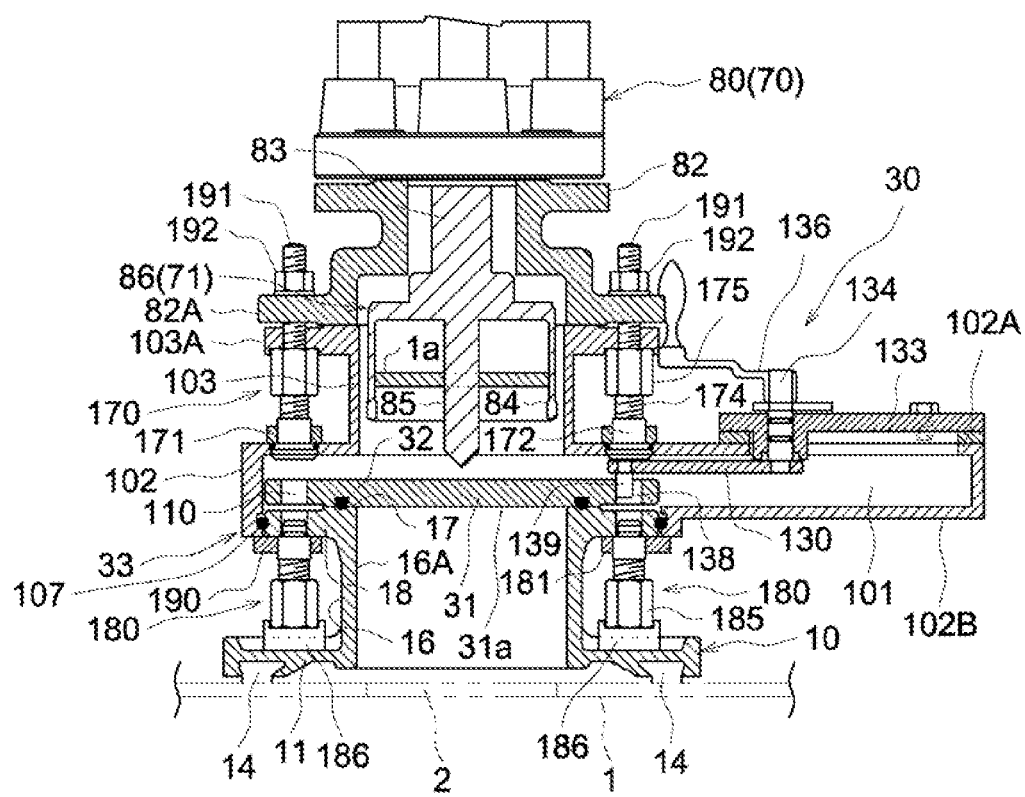
FIG. 7 is a sectional view when the drilling work is finished.

In a case where the work equipment 70 is the drilling device 80, as illustrated in FIGS. 6 and 7 (refer to FIGS. 18 and 19), a third flange 82A of a short pipe 82 coupled to a drilling drive case 81 is coupled to the second flange 103A of the coupling cylinder portion 103 of the valve housing 33 in a watertight state. In a state where the third flange 82A of the short pipe 82 is coupled to the second flange 103A of the coupling cylinder portion 103, a drive rotary shaft 83 of the drilling device 80 is present in an internal space of the coupling cylinder portion 103, and a rotary cutting tool 86 is mounted on a tip portion of the drive rotary shaft 83. The rotary cutting tool 86 includes a hole saw 84 having a cylindrical shape and including a cutting tip, and a center drill 85 that protrudes toward a tip side from a rotation center position inside the hole saw 84. The rotary cutting tool 86 of the drilling device 80 corresponds to a work portion 71 of the work equipment 70.

Figure 8:
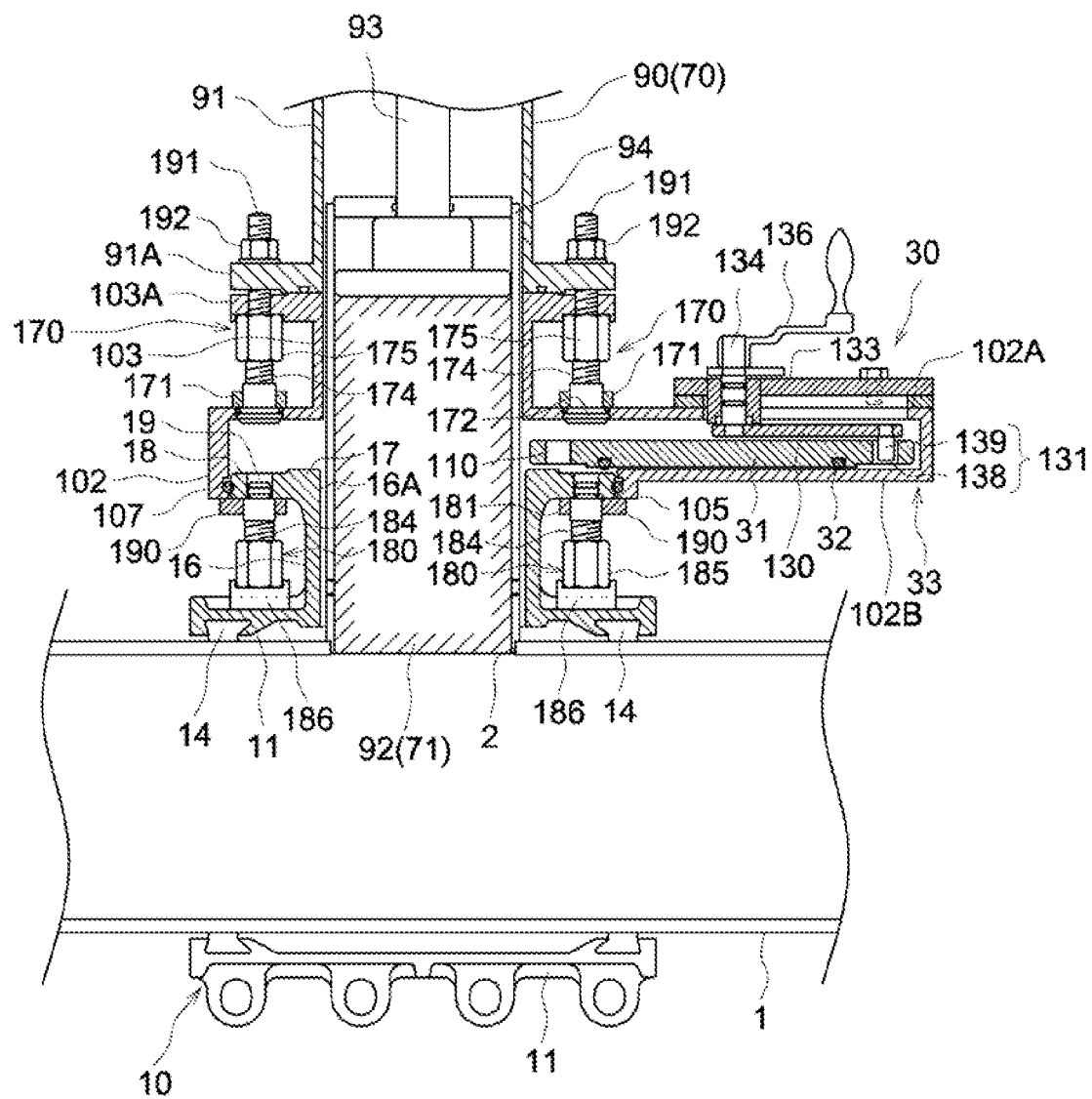
FIG. 8 is a sectional view when an in-pipe path closing work is started.

In a case where the work equipment 70 is the flow path-closing device 90, as illustrated in FIG. 8 (refer to FIG. 20), a fourth flange 91A of a closing case 91 is coupled to the second flange 103A of the coupling cylinder portion 103 of the valve housing 33 in a watertight state. In a state where the fourth flange 91A of the closing case 91 is coupled to the second flange 103A of the coupling cylinder portion 103, a closing bag 92 which is one example of a closing work portion accommodated in the closing case 91 and is accommodated in a reduced state is present in the internal space of the coupling cylinder portion 103. The closing bag 92 of the flow path-closing device 90 corresponds to the work portion 71 of the work equipment 70.

While maintaining a watertight state with respect to the closing case 91, the closing bag 92 is mounted on a tip portion of an operation cylinder shaft 93 which penetrates through the closing case 91 from outside and is supported to be movable along a branch axis direction. A fluid for diameter expansion is supplied into the closing bag 92 from a supply and discharge flow path 93a (refer to FIG. 20) inside the operation cylinder shaft 93, so that the closing bag 92 inflates to a state where an in-pipe flow path inside the fluid pipe 1 (refer to FIG. 4) can be closed.

In addition, the closing bag 92 is accommodated inside an insertion guide cylinder body 94 that is movable in the branch axis direction along an inner surface of the closing case 91, an inner surface of the coupling cylinder portion 103 of the valve housing 33, and an inner surface of the branch pipe 16. The insertion guide cylinder body 94 integrally moves together with the closing bag 92 as the operation cylinder shaft 93 is delivered inward, and the insertion guide cylinder body 94 comes into contact with an opening peripheral edge on an outer peripheral surface side of a through-hole 2, which is formed in the fluid pipe 1, to stop. In this state, when the operation cylinder shaft 93 is delivered further inward, the closing bag 92 is pulled out from the insertion guide cylinder body 94, and the closing bag 92 is inserted into the in-pipe flow path from the through-hole 2 of the fluid pipe 1.

In this embodiment, the valve device 30 configured as described above is used in a renewal work where the fluid pipe 1 forming a pipeline structure or piping equipment such as a fire hydrant is renewed without flow disruption, or an earthquake resistance work where piping equipment for earthquake resistance is replaced without flow disruption.

Subsequently, a method of a renewal and earthquake resistance work including a valve removal method of a fluid pipeline structure will be described.

[1] Split T-Shaped Pipe Mounting Step

As illustrated in FIG. 4, a split T-shaped pipe mounting step of externally mounting and fixing the split T-shaped pipe 10 having a split structure and including the branch pipe 16 on a portion upstream of a work target region of the fluid pipe 1 in a watertight state is executed.

In the split T-shaped pipe mounting step, the split couplers 11 which are three split elements of the split T-shaped pipe 10 are externally mounted on the fluid pipe 1, and the coupling flange portions 11A of both split couplers 11 adjacent to each other are tightened and fixed to each other in a watertight state by the bolts 12 and the nuts 13.

[2] Valve Device Mounting Step

As illustrated in FIGS. 3 and 4, a valve device mounting step of mounting the valve device 30 on the branch pipe 16 of the split T-shaped pipe 10 in a watertight state is executed.

The valve device mounting step includes a housing-exterior mounting step of externally mounting the valve housing 33 of the valve device 30 on the first flange 18, which is provided in the connection port portion 16A of the branch pipe 16, from the branch axis Y direction, and a pulling and fixing step of pulling the valve housing 33 toward the first flange 18 of the branch pipe 16 by the pulling bolt 122 of the second fastening portion 6 provided in the valve housing 33, and fixing the valve housing 33 to the first flange 18 in a watertight state in a sealed manner.

In the housing-exterior mounting step, the installation port portion 105 of the housing main body 102 forming the valve housing 33 of the valve device 30 is externally fitted and installed on the first flange 18 of the branch pipe 16 from the branch axis Y direction.

In this externally fitting and installation state, the lower end surface of the installation port portion 105 of the valve housing 33 is placed and supported on the load receiving portion 190 formed by the protrusion portions of the both second closing support plates 181 of the second hole closing tool 180 to be described later. In this placement and support state, the sliding guide surface 102b which corresponds to the inner surface side of the bottom plate 102B of the housing main body 102 and guides the sliding of the first packing 32 of the valve body 31, and the ring-shaped valve seat surface 17 of the connection port portion 16A on which the first packing 32 of the valve body 31 slides are disposed at the same or substantially the same height position. Accordingly, the opening and closing operation of the valve body 31 can be smoothly performed. Moreover, since the load receiving portion 190 is configured to be attachable to and detachable from the branch pipe 16 of the split T-shaped pipe 10, it is not required that the split T-shaped pipe 10 which is large and includes the branch pipe 16 is remade as when the load receiving portion 190 is formed integrally with the first flange 18 of the branch pipe 16; and thereby, it is possible to securely and easily install the valve housing 33 on the first flange 18 of the branch pipe 16 which is existing while reducing the initial investment.

In the pulling and fixing step, as illustrated in FIGS. 1 and 4, the pulling bolts 122 are screwed into the screw holes 121 of the mounting pieces 120 that are formed in the installation port portion 105 of the housing main body 102 at the plurality of locations in the circumferential direction. The tapered surfaces 122a of the pulling bolts 122 come into contact with the outer peripheral edge on the lower surface side of the first flange 18 from outward in the radial direction, and as the pulling bolts 43 are tightened, the valve housing 33 of the valve device 30 is pulled toward and fixed to a connection port portion 16A side of the branch pipe 16. Due to the pulling and fixing, as illustrated in FIG. 1, the seal member 107 which is installed in the seal installation groove 106 of the inner peripheral surface of the installation port portion 105 is compressed in a watertight state by the outer peripheral surface of the first flange 18.

As illustrated in FIG. 3, the foregoing valve device mounting step includes a step of mounting the first hole closing tool 170 that prevents the fluid from flowing out from the bolt insertion holes 102a penetrating through the top plate 102A of the housing main body 102. In the first hole closing tool mounting step, the first plug members 172 of the first closing support plates 171 forming the first hole closing tool 170 are disposed at the positions immediately above the bolt insertion holes 102a of the top plate 102A of the housing main body 102. In addition, the first long nut 175 is screwed onto the first screw shaft 174 of the first plug member 172 that is positioned in the central portion of the first closing support plate 171, and the upper end portion of the first long nut 175 is fitted and installed into the first positioning recess 176 of the lower surface of the second flange 103A of the coupling cylinder portion 103. In this state, when the first long nut 175 is rotationally operated to a tension side where the distance between the first long nut 175 and the first closing support plate 171 increases, the seal member 173 installed on each of the first plug members 172 is press-fitted into the bolt insertion hole 102a, so that the bolt insertion hole 102a is closed in a watertight state. When the first long nut 175 is further rotationally operated to the tension side, the first closing support plate 171 is pressed against the upper surface of the top plate 102A of the housing main body 102, and the first hole closing tool 170 is fixed in a tension state between the lower surface of the second flange 103A of the coupling cylinder portion 103 and the upper surface of the top plate 102A of the housing main body 102.

As illustrated in FIG. 3, the foregoing valve device mounting step includes a step of mounting the second hole closing tool 180 that prevents the fluid from flowing out from each of the first bolt insertion holes 19 which are formed in the first flange 18 of the branch pipe 16. In the second hole closing tool mounting step, the second plug members 182 of the second closing support plates 181 forming the second hole closing tool 180 are disposed at the positions immediately below the first bolt insertion holes 19 of the first flange 18. In addition, the second long nut 185 is screwed onto the second screw shaft 184 of the second plug member 182 that is positioned in the central portion of the second closing support plate 181, and the lower end portion of the second long nut 185 is fitted and installed into the second positioning recess 186a of the support base 186 that is fitted and installed on the rib 11B of the split coupler 11. In this state, when the second long nut 185 is rotationally operated to a tension side where the distance between the second long nut 185 and the second closing support plate 181 increases, the seal member 183 installed on each of the second plug members 182 is press-fitted into the first bolt insertion hole 19, so that the first bolt insertion hole 19 is closed in a watertight state. When the second long nut 185 is further rotationally operated to the tension side, the second closing support plate 181 is pressed against the lower surface of the first flange 18, and the second hole closing tool 180 is fixed in a tension state between the lower surface of the first flange 18 of the branch pipe 16 and the top of the split coupler 11 positioned uppermost.

Furthermore, the foregoing valve device mounting step includes an open valve setting step of setting the valve body 31 of the valve device 30 to the open valve position as illustrated in FIGS. 3 and 5(a), and a valve-pressing release setting step of setting the valve body-pressing portion 160 to a valve-pressing release setting state as illustrated in FIG. 4. In the open valve setting step, as illustrated in FIG. 3 and FIG. 5(a), the valve body 31 is set to the open valve position where the elongated hole 138 of the valve body 31 is most spaced apart from the branch flow path 16B of the branch pipe 16. In addition, in the valve-pressing release setting step, as illustrated in FIG. 4, the push bolt 162 which is screwed into the female screw member 161 of the top plate 102A of the housing main body 102 is set to a pressing release position where the push bolt 162 is spaced apart from the upper surface of the valve body 31.

[3] Drilling Device Mounting Step

As illustrated in FIG. 6, a drilling device mounting step (one example of a work equipment mounting step) of mounting the drilling device 80 which is one example of the work equipment 70 on the valve device 30 is executed. In detail, the third flange 82A of the short pipe 82 coupled to the drilling drive case 81 of the drilling device 80 is tightened and fixed to the second flange 103A of the coupling cylinder portion 103 of a housing main body 34 in a watertight state by bolts 191, which are screwed into the coupling screw holes 104 of the second flange 103A, and nuts 192.

When the drilling device 80 is mounted, since the through-hole 2 (refer to FIG. 7) is not formed in the fluid pipe 1, the valve body 31 of the valve device 30 is held at the open valve position.

[4] Drilling Work Performing Step

As illustrated in FIGS. 6 and 7, a drilling work step (one example of a predetermined work step) of performing a drilling work (one example of a predetermined work) where the rotary cutting tool 86 of the drilling device 80 is delivered inward toward a fluid pipe 1 side (refer to FIG. 7) which is a work target portion upstream of the branch pipe 16 and the through-hole 2 is formed in a pipe wall of the fluid pipe 1 is executed.

In the drilling work step, the virtual line in FIG. 6 illustrates a state where the rotary cutting tool 86 of the drilling device 80 is delivered into the branch pipe 16 of the split T-shaped pipe 10, and FIG. 7 illustrates a state where after the drilling work is performed, the rotary cutting tool 86 holding a cut piece 1a of the pipe wall moves to return to an initial position above (downstream of) the valve body 31 inside the housing main body 34.

[5] Drilling Device Removing Step

A drilling device removing step (one example of a work equipment removing step) of removing the drilling device 80 from the valve device 30 after the valve body 31 of the valve device 30 is operated to the closed valve position is executed. In the drilling device removing step, the bolt coupling between the second flange 103A of the coupling cylinder portion 103 of the housing main body 34 and the third flange 82A of the short pipe 82 of the drilling device 80 is released, and the drilling device 80 is removed from the valve device 30.

In addition, when the valve body 31 of the valve device 30 is operated to the closed valve position, the push bolts 162 which are screwed into the female screw members 161 of the top plate 102A of the housing main body 102 are screwed to a tightening side to press the upper surface of the valve body 31 at the closed valve position. Accordingly, the first packing 32 of the flow path-blocking surface 31a of the valve body 31 is maintained in a watertight state where the first packing 32 is crimped by the ring-shaped valve seat surface 17 of the connection port portion 16A of the branch pipe 16.

[6] Flow Path-Closing Device Mounting Step.

As illustrated in FIG. 8, a flow path-closing device mounting step (one example of a work equipment mounting step) of mounting the flow path-closing device 90 which is one example of the work equipment 70 on the valve device 30 is executed.

In the flow path-closing device mounting step, the fourth flange 91A of the closing case 91 of the flow path-closing device 90 is tightened and fixed to the second flange 103A of the coupling cylinder portion 103 of the housing main body 34 in a watertight state by the bolts 191, which are screwed into the coupling screw holes 104 of the second flange 103A, and the nuts 192. In this coupling state, the closing bag 92 in a reduced state, which is one example of the closing work portion and is accommodated in the closing case 91, faces the internal flow path 103B of the coupling cylinder portion 103.

[7] Flow Path Closing Work Step

As illustrated in FIG. 8, a flow path closing work step (one example of a predetermined work step) of operating the valve body 31 of the valve device 30 to the open valve position and delivering the closing bag 92 of the flow path-closing device 90 into the fluid pipe 1 (refer to FIG. 4) which is a closing work target portion on the upstream side to close the in-pipe flow path is executed.

In the flow path closing work step, before the valve body 31 of the valve device 30 is operated to the open valve position, the push bolts 162 of the valve body-pressing portions 160 are rotationally operated to the pressing release position where the push bolts 162 are spaced apart from the upper surface of the valve body 31.

Subsequently, after the valve body 31 is operated to the open valve position, the operation cylinder shaft 93 is delivered inward from outside the closing case 91, and the insertion guide cylinder body 94 and the closing bag 92 are integrally delivered inward. Thereafter, the insertion guide cylinder body 94 comes into contact with the opening peripheral edge of the through-hole 2 in an outer peripheral surface of the fluid pipe 1 to stop. In this state, when the operation cylinder shaft 93 is delivered further inward, the closing bag 92 is pulled out from the insertion guide cylinder body 94, and the closing bag 92 is inserted into a predetermined close position in the in-pipe flow path from the through-hole 2 of the fluid pipe 1. In this state, the fluid for diameter expansion is supplied into the closing bag 92 from the supply and discharge flow path 93a (refer to FIG. 20) inside the operation cylinder shaft 93, so that the closing bag 92 inflates to a state where the in-pipe flow path inside the fluid pipe 1 is closed.

Then, when the in-pipe flow path inside the fluid pipe 1 is closed by the closing bag 92 of the flow path-closing device 90, in a work target region downstream of the close position, a predetermined work such as a renewal work where the fluid pipe 1 forming a pipeline structure or piping equipment such as a fire hydrant is renewed without water disruption, or an earthquake resistance work where piping equipment for earthquake resistance is replaced without water disruption is performed.

[8] Flow Path-Closing Device Removing Step

As illustrated in FIG. 9, a flow path-closing device removing step (one example of the work equipment removing step) of removing the flow path-closing device 90 from the valve device 30 after the valve body 31 of the valve device 30 is operated to the closed valve position is executed.

In the flow path-closing device removing step, when the predetermined work is finished, the fluid for diameter expansion in the closing bag 92 which closes the in-pipe flow path inside the fluid pipe 1 is discharged from the supply and discharge flow path 93a (refer to FIG. 20) inside the operation cylinder shaft 93, so that the closing bag 92 is brought into a contracted state where the diameter thereof is reduced. In this state, the operation cylinder shaft 93 returns upward, so that the closing bag 92 and the insertion guide cylinder body 94 are accommodated in the closing case 91.

Subsequently, as illustrated in FIG. 9, after the valve body 31 is operated to the closed valve position, the push bolts 162 which are screwed into the female screw members 161 of the top plate 102A of the housing main body 102 are screwed to a tightening side, so that the first packing 32 of the flow path-blocking surface 31a of the valve body 31 is maintained in a watertight state where the first packing 32 is crimped by the ring-shaped valve seat surface 17 of the connection port portion 16A of the branch pipe 16. Thereafter, the bolt coupling between the second flange 103A of the coupling cylinder portion 103 of the housing main body 34 and the fourth flange 91A of the closing case 91 is released, and the flow path-closing device 90 is removed from the valve device 30.

After the flow path-closing device removing step is finished, the procedure proceeds to the valve removal method.

[9] Valve Body Fixing Step of Valve Removal Method

Figure 10:
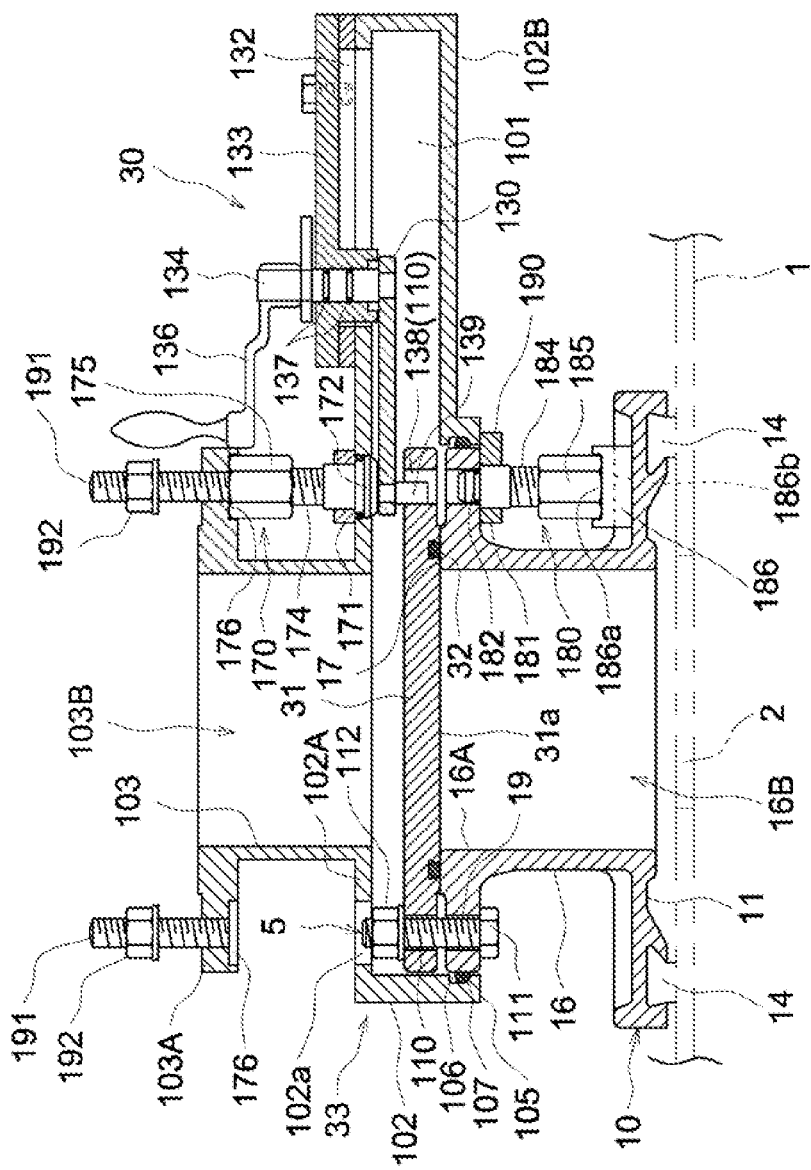
FIG. 10 is a sectional view during the work of fixing the valve body.

As illustrated on the left side of FIG. 10, a valve body fixing step of fixing the valve body 31 at the closed valve position to the first flange 18 of the branch pipe 16 in a watertight state in a sealed manner includes a step of removing the first hole closing tool 170 that prevents the fluid from flowing out form the bolt insertion holes 102a of the top plate 102A of the housing main body 102, a step of removing the second hole closing tool 180 that prevents the fluid from flowing out from the first bolt insertion holes 19 of the first flange 18, and a valve body fixing and coupling step of fixing and coupling the valve body 31 at the closed valve position and the first flange 18 of the branch pipe 16 to each other in a watertight state by the bolt 111 and the nut 112 of the first fastening portion 5.

In the first hole closing tool removing step, when the first long nuts 175 of the first hole closing tool 170 are rotationally operated to a loose side, the tension state of the first hole closing tool 170 which is fixed between the lower surface of the second flange 103A of the coupling cylinder portion 103 and the upper surface of the top plate 102A of the housing main body 102 is released. Accordingly, the upper end portions of the first long nuts 175 separate from the first positioning recesses 176 of the lower surface of the second flange 103A of the coupling cylinder portion 103. In this separation state, the first plug members 172 of the first closing support plates 171 are pulled out from the bolt insertion holes 102a of the top plate 102A, and the first hole closing tool 170 is removed.

In the second hole closing tool removing step, when the second long nuts 185 of the second hole closing tool 180 are rotationally operated to a loose side, the tension state of the second hole closing tool 180 which is fixed between the lower surface of the first flange 18 of the branch pipe 16 and the top of the split coupler 11 positioned uppermost is released. Accordingly, the lower end portions of the second long nuts 185 separate from the second positioning recesses 186a of the support bases 186, and the support bases 186 are removed from the ribs 11B of the split coupler 11. Subsequently, the second plug members 182 of the second closing support plates 181 are pulled out from the first bolt insertion holes 19 of the first flange 18, and the second hole closing tool 180 is removed.

In the valve body fixing and coupling step, the bolts 111 are inserted into the first bolt insertion holes 19 of the first flange 18 of the branch pipe 16 from below, and the nuts 112 are inserted into the bolt insertion holes 102a of the top plate 102A of the housing main body 102 from above. The valve body 31 at the closed valve position and the first flange 18 of the branch pipe 16 are fixed and coupled to each other in a watertight state by fastening the bolts 111 and the nuts 112 by screwing.

[10] Valve Component Removing Step of Valve Removal Method

As illustrated in FIGS. 10 and 11, a valve component removing step of removing other unnecessary valve components while the valve body 31 fixed to the first flange 18 of the branch pipe 16 is left on the first flange 18 of the branch pipe 16 is executed.

In the valve component removing step, as illustrated in FIG. 9, the pulling bolts 122 are screwed to a loose side with respect to the screw holes 121 of the mounting pieces 120 that are formed in the installation port portion 105 of the housing main body 102 at the plurality of locations in the circumferential direction. Accordingly, the tapered surfaces 122a of the pulling bolts 122 separate outward in the radial direction from the outer peripheral edge on the lower surface side of the first flange 18. In this state, the installation port portion 105 of the valve housing 33 is removed from the first flange 18 of the branch pipe 16; and thereby, it is also possible to simultaneously remove the other unnecessary valve components that are integrally assembled with the valve housing 33. Therefore, it is possible to efficiently and easily perform the work of removing the other valve components including the valve housing 33.

The valve body 31 has a smaller outer diameter than the inner diameter of the installation port portion 105 of the valve housing 33, and is coaxially fixed to the first flange 18 of the branch pipe 16 in a watertight state in a sealed manner. For this reason, when the valve housing 33 is removed, the valve housing 33 can be easily pulled out along the branch axis Y direction without a peripheral edge of the installation port portion 105 of the valve housing 33 being caught by an outer peripheral edge of the valve body 31. Therefore, it is possible to more efficiently and easily perform the work of removing the other unnecessary valve components.

First Example of First Embodiment

Figure 12:
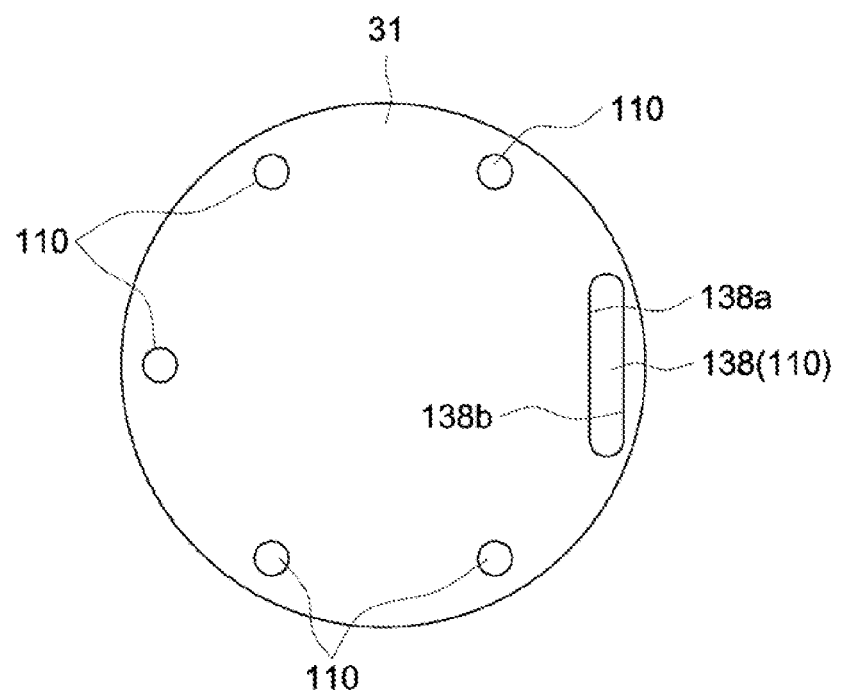
FIG. 12 is a plan view of a valve body illustrating a first example of the first embodiment.

FIG. 12 illustrates a first example of the linkage mechanism 131 that causes the valve body 31 to reciprocate between the closed valve position and the open valve position in conjunction with the rotation of the rotary arm 130 in the first embodiment. In the first example, the both inner surfaces 138a and 138b in the elongated hole 138 of the valve body 31 in the valve movement direction, the elongated hole 138 forming one of the linkage mechanism 131, are formed in a parallel or substantially parallel posture along the valve passage width direction of the valve movement passage 101.

Similar to the first embodiment, the engagement protrusion 139 of the rotary arm 130 disengageably engages with the elongated hole 138 of the valve body 31 from above, and is disposed therein. For this reason, as the valve housing 33 moves upward to separate from the valve body 31 fixed to the connection port portion 16A of the branch pipe 16, the engagement protrusion 139 of the rotary arm 130 assembled to the valve housing 33 is pulled upward out from the elongated hole 138 of the valve body 31. Accordingly, the state of connection between the engagement protrusion 139 of the rotary arm 130 and the elongated hole 138 of the valve body 31 is changed from a linked state to a non-linked state.

In addition, as described above, since the both inner surfaces 138a and 138b of the elongated hole 138 of the valve body 31 are in a parallel or substantially parallel posture, even when the engagement protrusion 139 of the rotary arm 130 rotates to either of the closed valve position and the open valve position, slide between the engagement protrusion 139 and the both inner surfaces 138a and 138b of the elongated hole 138 is smooth; and thereby, it is possible to smoothly perform the opening and closing operation of the valve body 31.

Incidentally, since other configurations are the same as those described in the first embodiment, the same reference numbers as those in the first embodiments are assigned to the same components, and the descriptions thereof will be omitted.

Second Example of First Embodiment

Figure 13:
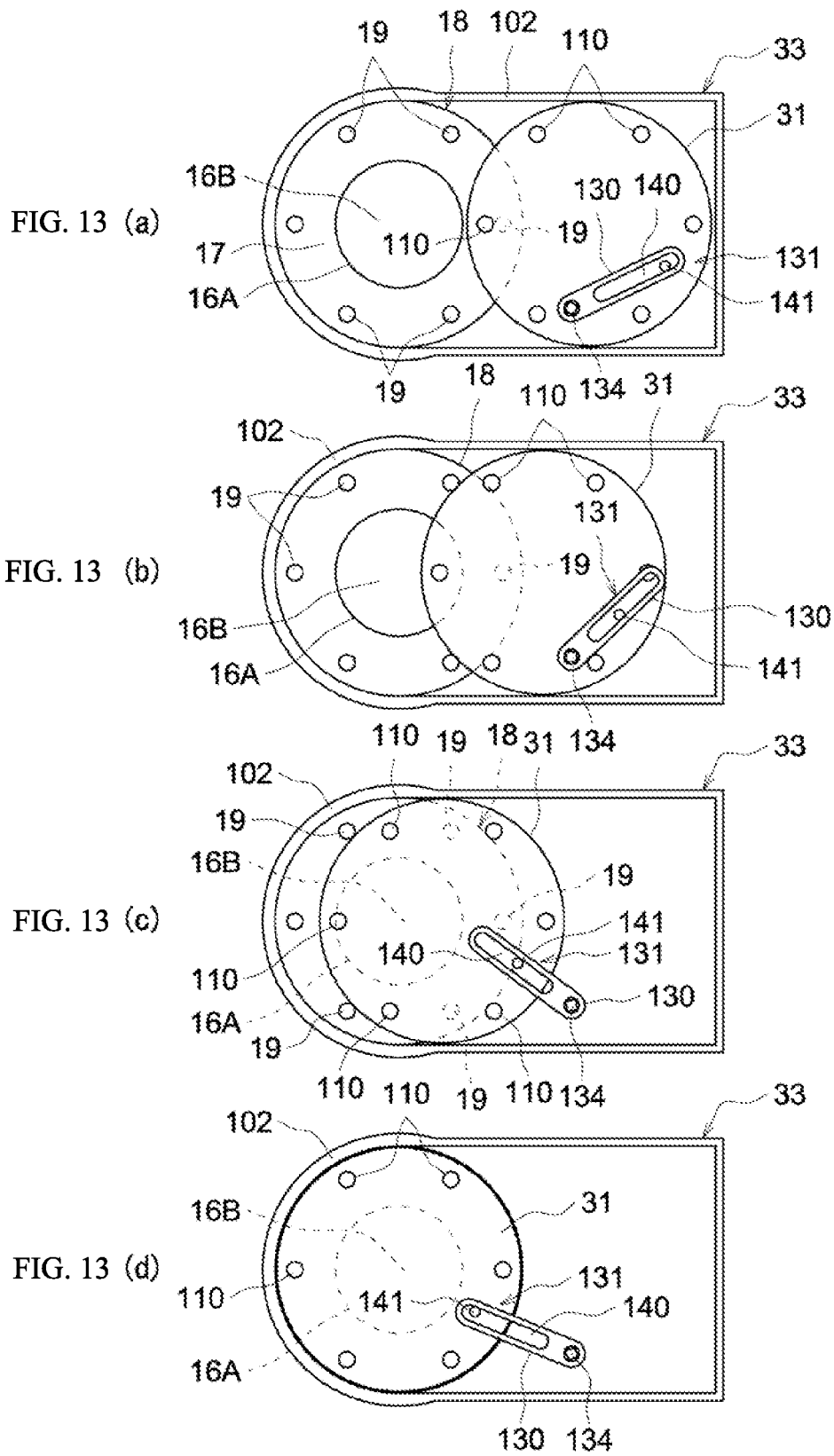
FIGS. 13(a)-13(d) are views describing the operation of a valve body of a valve device illustrating a second example of the first embodiment.

FIG. 13 illustrates a second example of the linkage mechanism 131 that causes the valve body 31 to reciprocate between the closed valve position and the open valve position in conjunction with the rotation of the rotary arm 130 in the first embodiment. In the second example, the linkage mechanism 131 includes an elongated hole 140 that is formed in the rotary arm 130, and an engagement protrusion 141 that is provided in a base end portion of the valve body 31 on an upstream side in the valve closing direction.

Also in the second example, the elongated hole 140 of the rotary arm 130 disengageably engages with the engagement protrusion 141 of the valve body 31 from above. For this reason, as the valve housing 33 moves upward to separate from the valve body 31 fixed to the connection port portion 16A of the branch pipe 16, the engagement protrusion 139 of the rotary arm 130 assembled to the valve housing 33 is pulled upward out from the elongated hole 138 of the valve body 31. Accordingly, the state of connection between the engagement protrusion 139 of the rotary arm 130 and the elongated hole 138 of the valve body 31 is changed from a linked state to a non-linked state.

Incidentally, since other configurations are the same as those described in the first embodiment, the same reference numbers as those in the first embodiments are assigned to the same components, and the descriptions thereof will be omitted.

Second Embodiment

Figure 14:
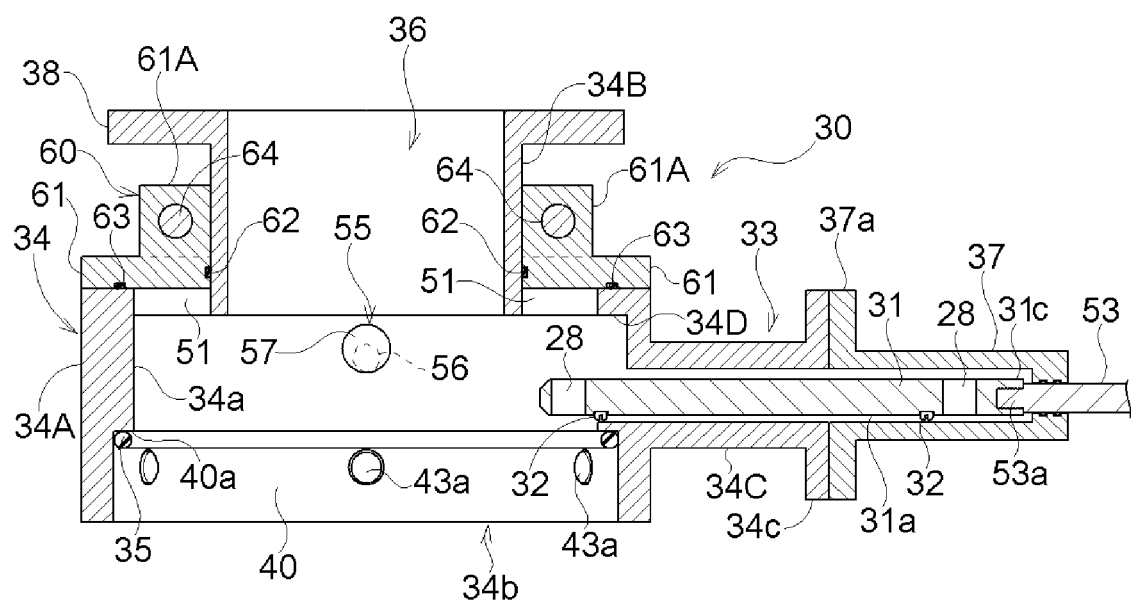
FIG. 14 is a longitudinal sectional view of a valve device of a second embodiment.
Figure 15:
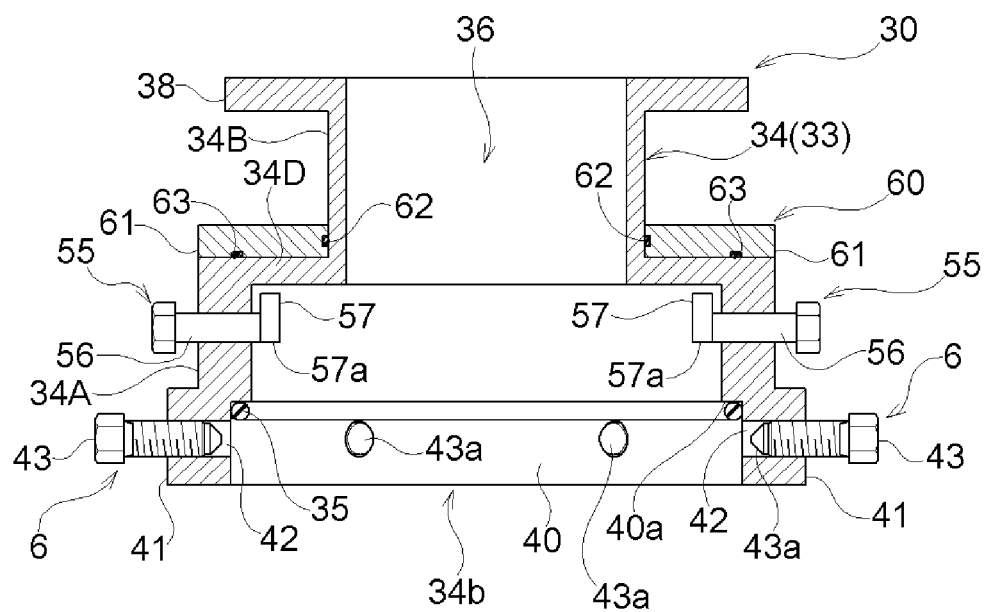
FIG. 15 is a transverse sectional view of the valve device.
Figure 16:
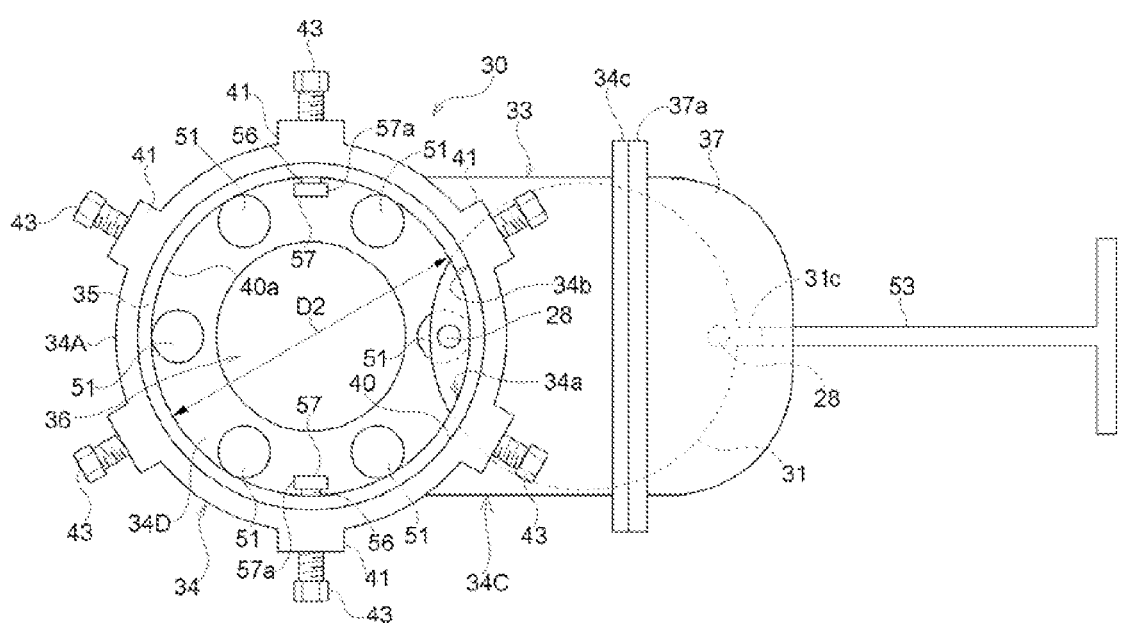
FIG. 16 is a bottom view of the valve device.

FIGS. 14 to 16 illustrate another embodiment of the valve device 30. FIGS. 17 to 24 illustrate a method of a renewal and earthquake resistance work including a valve removal method in a pipeline structure using the valve device 30 of the another embodiment.

Figure 17:
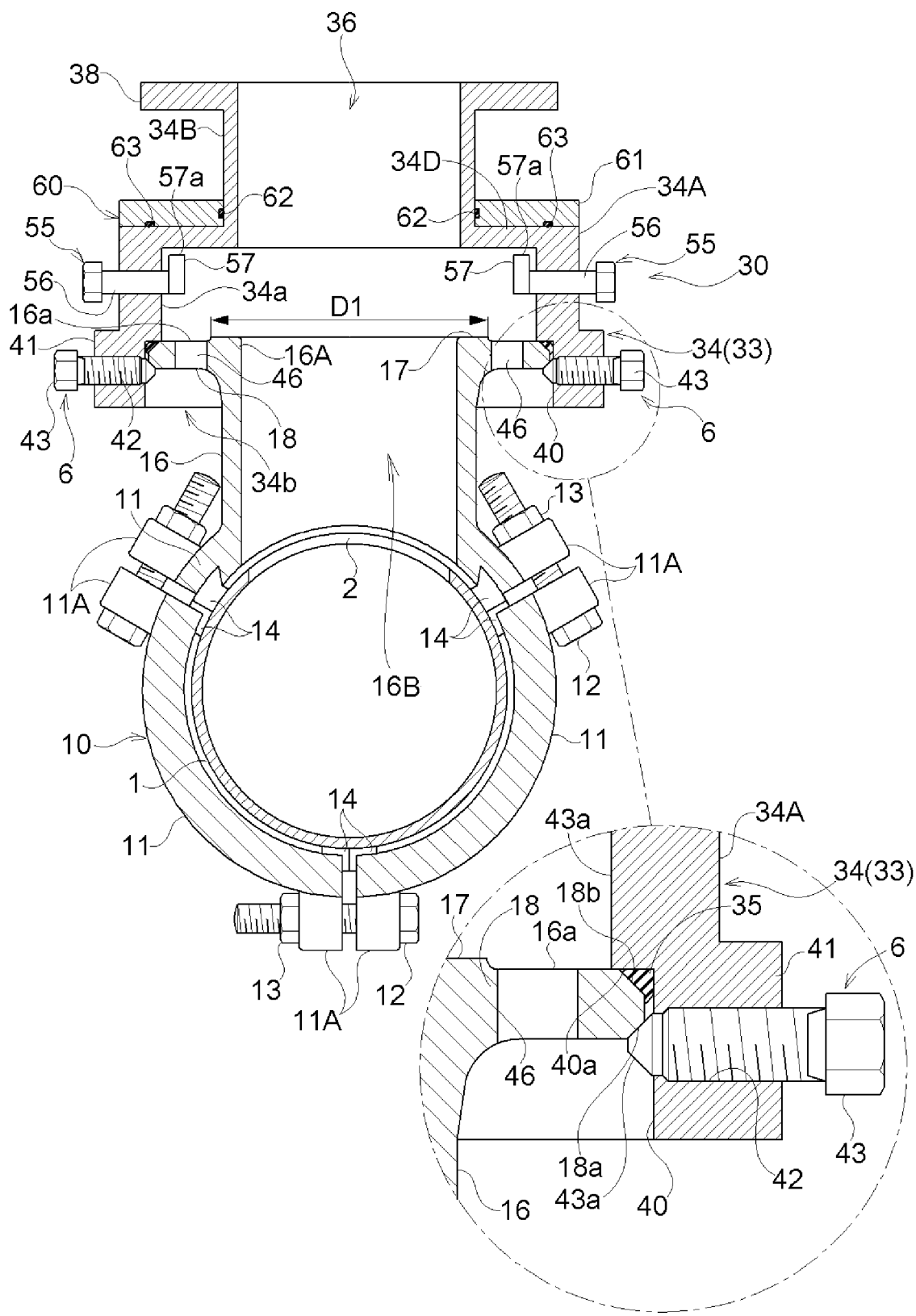
FIG. 17 is a transverse sectional view when a split T-shaped pipe and the valve device are assembled to the fluid pipe.
Figure 21:
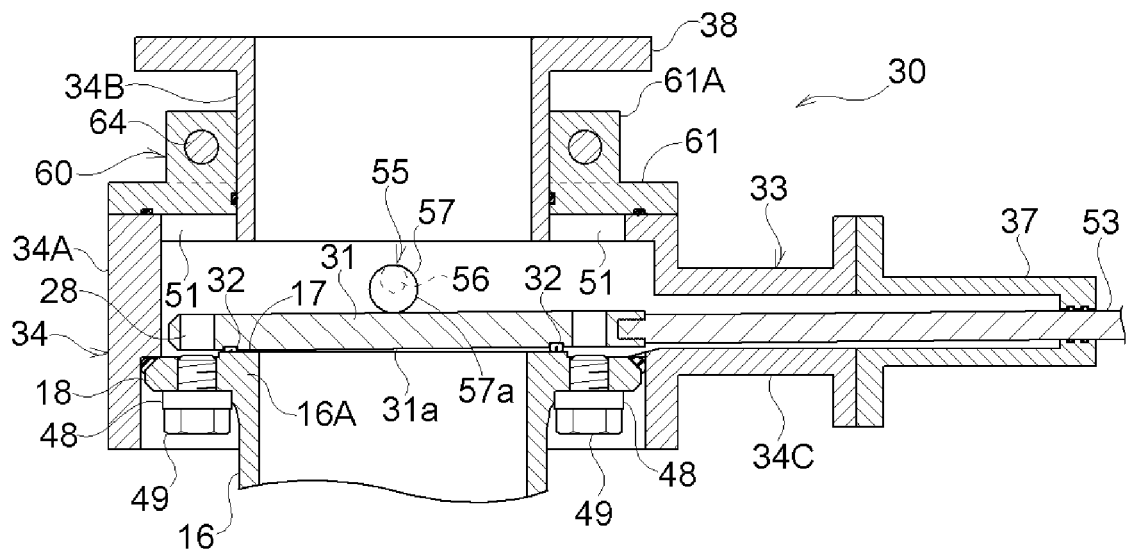
FIGS. 21(a)-21(b) are sectional views illustrating a pressed state of a valve body at the closed valve position.
Figure 21:
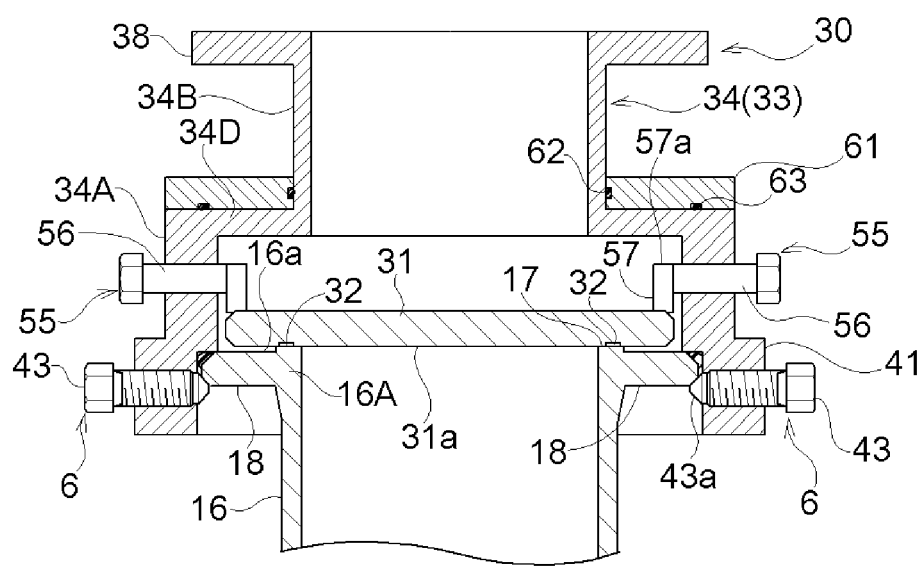

In the split T-shaped pipe 10 used in the another embodiment, as illustrated in FIGS. 17 and 21, the ring-shaped valve seat surface 17 which has an annular shape and with which the first packing 32 installed on the flow path-blocking surface 31a that corresponds to the lower surface side of the valve body 31 of the valve device 30 can come into uniform or substantially uniform contact protrudes from the connection end surface 16a of the connection port portion 16A of the branch pipe 16. Furthermore, as illustrated in FIG. 17, the first flange 18 which has an annular shape and horizontally protrudes outward in the pipe radial direction is integrally formed on the outer peripheral surface of the connection port portion 16A of the branch pipe 16. As illustrated in FIG. 17, a pulling inclined surface 18a having an annular shape which pulls the valve housing 33 of the valve device 30 toward the connection port portion 16A side of the branch pipe 16 and fixes the valve housing 33 to the connection port portion 16A side is formed in a lower annular corner on an outer peripheral surface side of the first flange 18. A packing-pressing inclined surface 18b having an annular shape and compressing a second packing 35, which is installed in the valve housing 33 of the valve device 30, in a watertight state is formed in an upper annular corner on the outer peripheral surface side of the first flange 18.

Since configurations other than the foregoing configuration of the split T-shaped pipe 10 are the same as the configurations described in the first embodiment, the same reference numbers as those in the first embodiment are assigned to the same components, and the descriptions thereof will be omitted.

Subsequently, the valve device 30 will be described in detail.

As illustrated in FIGS. 14 to 16, as main components, the valve device 30 includes the valve housing 33 made of metal and having an internal flow path 36 that communicates with the branch flow path 16B of the branch pipe 16 from the branch axis direction (flow path axis direction), and the valve body 31 made of metal which has a plate shape and opens and closes the internal flow path 36 from a direction orthogonal to the branch axis direction.

As illustrated in FIGS. 14 to 16, the valve housing 33 of the valve device 30 includes a housing main body 34 in which a large-diameter cylindrical portion 34A and a small-diameter cylindrical portion 34B which are coaxially disposed in the branch axis direction are formed integrally with a valve guide cylinder portion 34C that communicates with the large-diameter cylindrical portion 34A from a horizontal direction and guides the movement of the valve body 31 in an opening and closing direction. A valve guide case 37 which guides the movement of the valve body 31 in the opening and closing direction in collaboration with the valve guide cylinder portion 34C is detachably coupled to the valve guide cylinder portion 34C of the housing main body 34 in a watertight state.

Then, the valve housing 33 of the valve device 30 includes the housing main body 34 and the valve guide case 37. A flange portion 34c of the valve guide cylinder portion 34C of the housing main body 34 and a flange portion 37a of the valve guide case 37 are detachably joined to each other in a watertight state by bolts and nuts (not illustrated).

A second flange 38 to which the work equipment 70 or piping equipment is detachably coupled in a watertight state is formed integrally with an upper end portion of the housing main body 34, which is a downstream side end portion of an outer peripheral surface of the small-diameter cylindrical portion 34B. Similar to the first embodiment, examples of the work equipment 70 coupled to the second flange 38 of the housing main body 34 can include the drilling device 80 illustrated in FIGS. 18 and 19, the flow path-closing device 90 illustrated in FIG. 20, and the like.

As illustrated in FIGS. 14 to 17, an installation port portion 40 which is externally fitted and installed on the first flange 18 of the branch pipe 16 from the branch axis direction in a detachable manner is formed in a lower end portion of the large-diameter cylindrical portion 34A of the housing main body 34. An annular stepped surface 40a which is formed at an inner corner on a deep side of the installation port portion 40 is formed as a placement and support surface that comes into contact with the connection end surface 16a of the first flange 18 of the branch pipe 16 from the branch axis direction.

In addition, as illustrated in FIG. 15 to FIG. 17, reinforcement portions 41 which are thick and protrude outward are formed in the large-diameter cylindrical portion 34A of the housing main body 34 at a plurality of locations in a circumferential direction (six locations in the circumferential direction) of the installation port portion 40. A screw hole 42 having a screw axis at a height position which substantially corresponds to the lower surface of the first flange 18 of the branch pipe 16 penetrates through each of the reinforcement portions 41. As illustrated in FIG. 17, a pulling bolt 43 including a tapered surface 43a which comes into contact with the pulling inclined surface 18a of the first flange 18 from outward in the radial direction is detachably screwed into each of the screw holes 42.

As illustrated in FIGS. 15 and 17, the screw hole 42 formed in the reinforcement portion 41 of the installation port portion 40 of the large-diameter cylindrical portion 34A, the pulling bolt 43 screwed into the screw hole 42, and the pulling inclined surface 18a of the first flange 18 with which the tapered surface 43a of the pulling bolt 43 comes into contact form the second fastening portion 6 that pulls the valve housing 33 of the valve device 30 toward the first flange 18 of the branch pipe 16 and fixes the valve housing 33 to the first flange 18 in a watertight state.

As illustrated in FIGS. 14 and 15, the second packing 35 is installed on the annular stepped surface 40a positioned inward from the installation port portion 40 in the large-diameter cylindrical portion 34A. For this reason, as illustrated in FIG. 17, when the installation port portion 40 of the valve housing 33 is externally fitted and installed on the first flange 18 of the branch pipe 16 from the branch axis direction, and in this state, the pulling bolts 43 which are screwed into the screw holes 42 of the reinforcement portions 41 of the housing main body 34 are tightened, the valve housing 33 of the valve device 30 is pulled toward the connection port portion 16A side of the branch pipe 16, and the second packing 35 which is installed on the annular stepped surface 40a positioned inward from the installation port portion 40 is compressed in a watertight state between the annular stepped surface 40a and the packing-pressing inclined surface 18b of the first flange 18 of the branch pipe 16.

Figure 18:
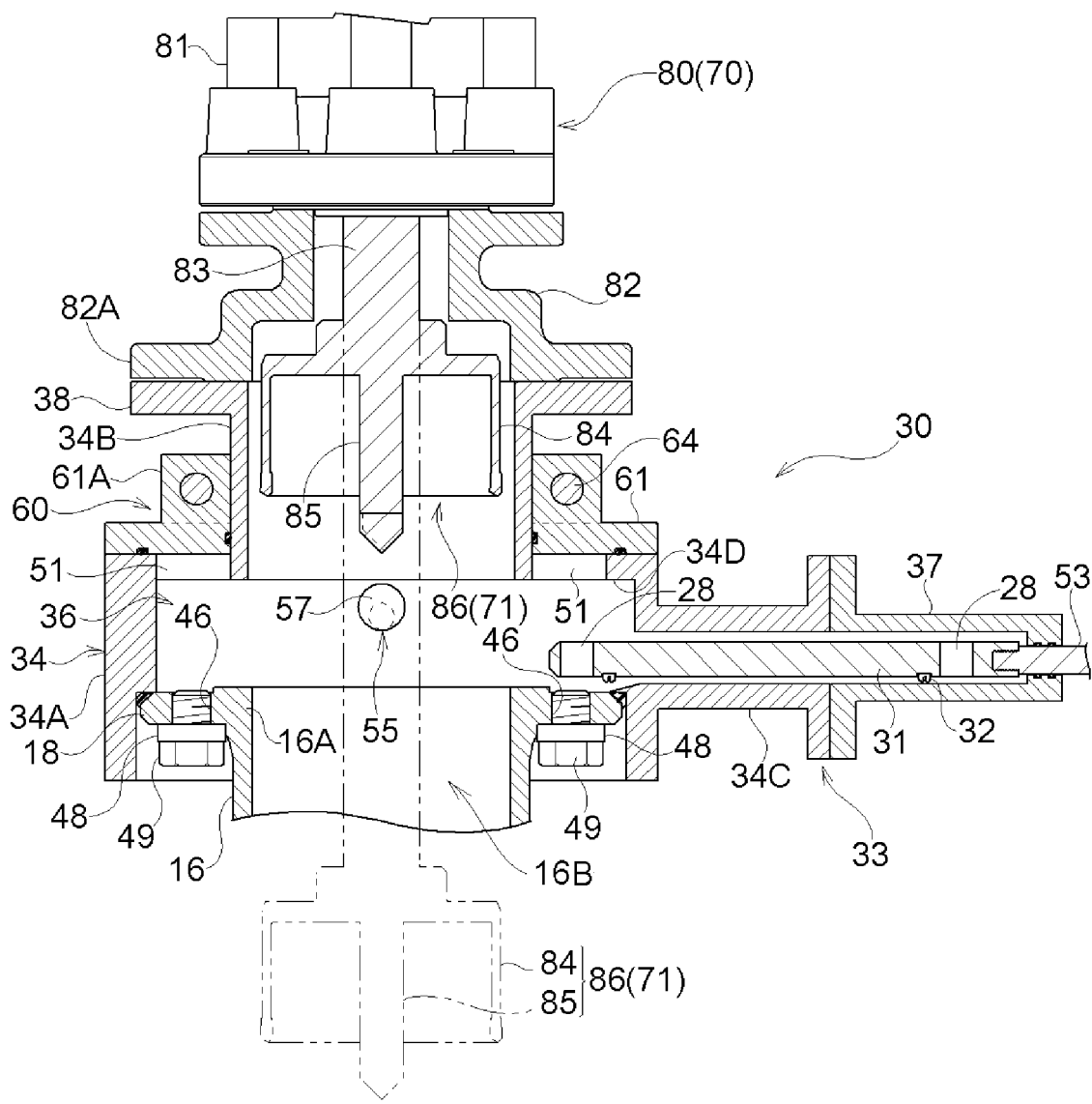
FIG. 18 is a sectional view when a drilling work is started.

Screw holes 46 serving as coupling holes into which valve-fixing bolts 45 (refer to FIGS. 22 and 23) that fix the valve body 31 at the closed valve position in a watertight state can be inserted are formed in the first flange 18 of the branch pipe 16 at a plurality of locations (six locations in this embodiment) in the circumferential direction. When the valve body 31 is not fixed to the first flange 18 in a sealed manner, as illustrated in FIG. 18, a waterstop bolt 49 including a waterstop washer 48 is screwed into each of the screw holes 46 from below to prevent water from leaking from the screw hole 46 of the first flange 18.

Figure 23:
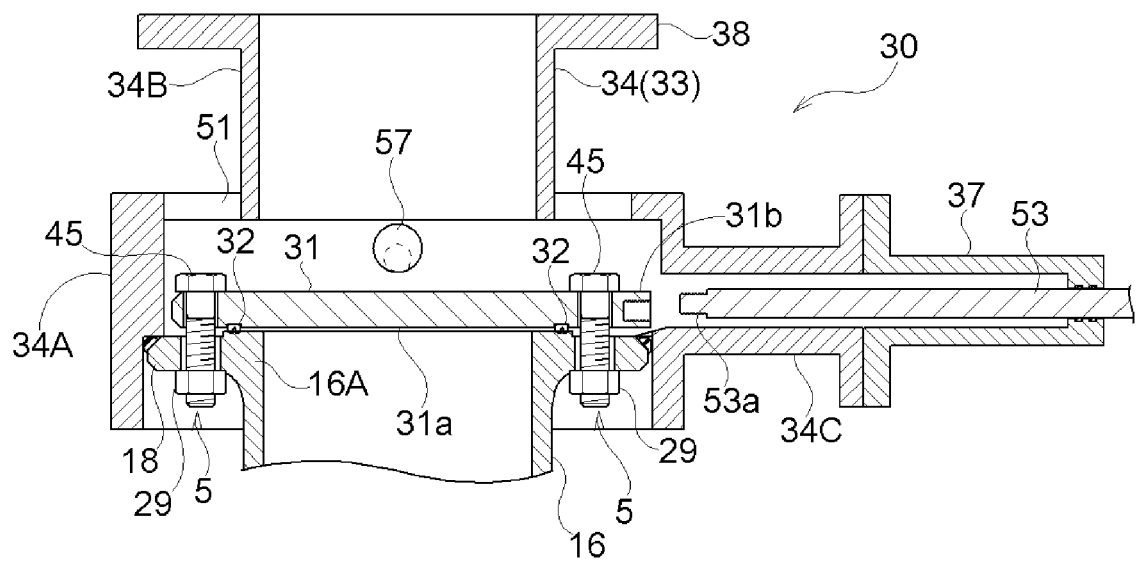
FIGS. 23(a)-23(b) are sectional views when the operating member is detached from the valve body.
Figure 23:
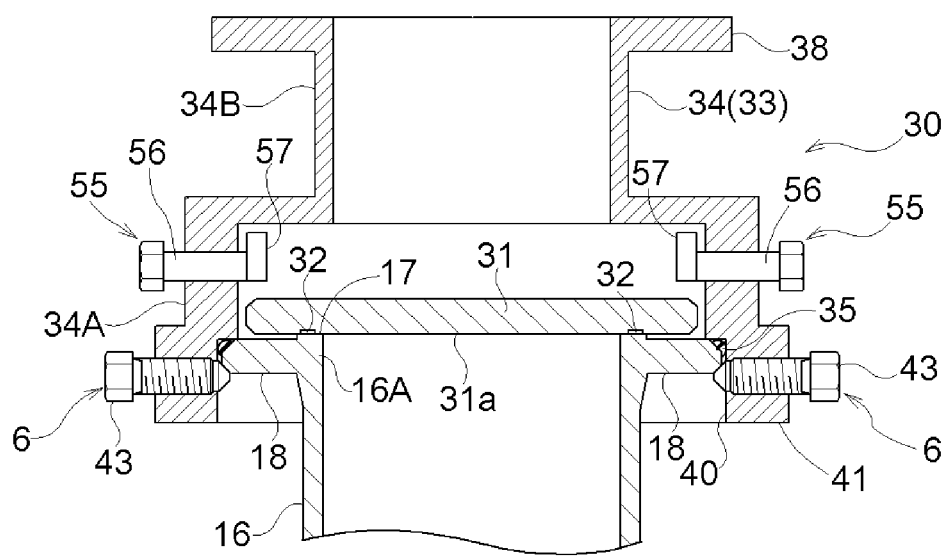

Furthermore, mounting holes 28 into which the valve-fixing bolts 45 (refer to FIGS. 22 and 23) can be inserted from above penetrate through the valve body 31 of the valve device 30 at a plurality of locations (six locations in this embodiment) in the circumferential direction. The mounting holes 28 of the valve body 31 and the screw holes 46 of the first flange 18 are disposed with the same pitch at the same phase positions. As illustrated in FIG. 23, a tip side screw portion of the valve-fixing bolt 45 which is inserted into the mounting hole 28 of the valve body 31 from above and is inserted through the screw hole 46 of the first flange 18 protrudes downward from the screw hole 46 of the first flange 18. A nut 29 is screwed onto the protruding screw portion on the tip side of the valve-fixing bolt 45.

Then, the mounting hole 28 of the valve body 31, the screw hole 46 of the first flange 18 of the branch pipe 16, the valve-fixing bolt 45, and the nut 29 form the first fastening portion 5 (refer to FIGS. 22 and 23) that fixes the valve body 31 to the first flange 18 of the branch pipe 16 in a watertight state in a sealed manner.

Bolt insertion holes 51 through which the valve-fixing bolts 45 are inserted into an internal space of the housing main body 34 as illustrated in FIG. 22 penetrate through an annular step portion 34D, which connects the large-diameter cylindrical portion 34A and the small-diameter cylindrical portion 34B of the housing main body 34 as illustrated in FIGS. 14 to 16, at a plurality of locations (six locations in this embodiment) in the circumferential direction which face the screw holes 46 of the first flange 18 in the branch axis direction. The bolt insertion hole 51 of the annular step portion 34D has a larger diameter than that of the mounting hole 28 of the valve body 31, and the bolt insertion holes 51 and the mounting holes 28 of the valve body 31 at the closed valve position are disposed with the same pitch at the same phase positions. When the valve body 31 is not fixed to the first flange 18, as illustrated in FIGS. 14, 15, and 22, a hole closing tool 60 which has a split structure and closes all of the bolt insertion holes 51 in a watertight state are mounted on the housing main body 34.

As illustrated in FIGS. 14, 15, and 22, the hole closing tool 60 includes split closing members 61 that can come into contact with an outer peripheral surface of the small-diameter cylindrical portion 34B of the housing main body 34 and an upper surface of the annular step portion 34D and are split into a plurality of pieces of members in the circumferential direction (two pieces of members in the circumferential direction in this embodiment).

As illustrated in FIGS. 14, 15, and 22, each of the split closing members 61 is formed into the shape of a semi-arc-shaped plate which can cover a plurality of (three in this embodiment) the bolt insertion holes 51, which are positioned a semi-circular region, from above. A first elastic seal member 62 is provided on an inner peripheral surface of each of the split closing members 61 to seal a gap between the inner peripheral surface thereof and the outer peripheral surface of the small-diameter cylindrical portion 34B of the housing main body 34 in a watertight state. A second elastic seal member 63 is provided on a lower surface of each of the split closing members 61 to seal the lower surface thereof and the upper surface of the annular step portion 34D in a watertight state. Both end portions of each of the split closing members 61 in the circumferential direction are provided with coupling flange portions 61A. The coupling flange portions 61A of the both split closing members 61, which face each other in the circumferential direction among the coupling flange portions 61A, are detachably tightened to each other by bolts 64 and nuts (not illustrated), so that the both split closing members 61 are fixed and coupled to each other in an annular shape. Due to the fixing and coupling, the first elastic seal members 62 and the second elastic seal members 63 of the both split closing members 61 are compressed in a watertight state.

The valve body 31 has a circular shape which has a larger diameter than an outer diameter D1 (refer to FIG. 17) of the ring-shaped valve seat surface 17 of the connection end surface 16a of the branch pipe 16 and has a smaller diameter than an inner diameter D2 (refer to FIG. 16) of a small-diameter inner peripheral surface 34a in the large-diameter cylindrical portion 34A of the housing main body 34.

In addition, as illustrated in FIGS. 14 and 16, a female screw portion 31c along the valve movement direction is integrally formed in the base end portion of the valve body 31 on the upstream side in the valve closing direction (end portion that is spaced apart from the flow path opening of the branch pipe 16). A male screw portion 53a on a tip side of an operating member 53 which has a substantially T shape and opens and closes the valve body 31 is detachably screwed into and coupled to the female screw portion 31c. One end portion of the female screw portion 31c protrudes outward from an outer peripheral edge of the valve body 31 in the radial direction. For this reason, the outer dimension of the valve body 31 in a diameter direction, which passes through a center line of the female screw portion 31c, becomes the maximum dimension of the valve body 31. When the maximum dimension of the valve body 31 cannot be smaller than the inner diameter D2 of the small-diameter inner peripheral surface 34a in the large-diameter cylindrical portion 34A of the housing main body 34, or the maximum dimension of the valve body 31 cannot be reduced, a cutout portion through which a protrusion portion of the female screw portion 31c of the valve body 31 can pass is formed in the large-diameter cylindrical portion 34A of the housing main body 34.

In addition, the opening diameter of an opening 34b of the installation port portion 40 of the housing main body 34 has a larger diameter than the maximum dimension of the valve body 31.

According to the foregoing configuration, as illustrated in FIG. 23, while the valve body 31 which is fixed to the connection port portion 16A of the branch pipe 16 in a sealed manner is left, when the valve housing 33 which is another unnecessary valve component is pulled out and removed, the valve housing 33 can be easily pulled out along the branch axis direction without the installation port portion 40 of the housing main body 34 being caught by the valve body 31. Therefore, it is possible to efficiently and easily perform a work of removing the valve housing 33 which is another valve component.

Figure 19:
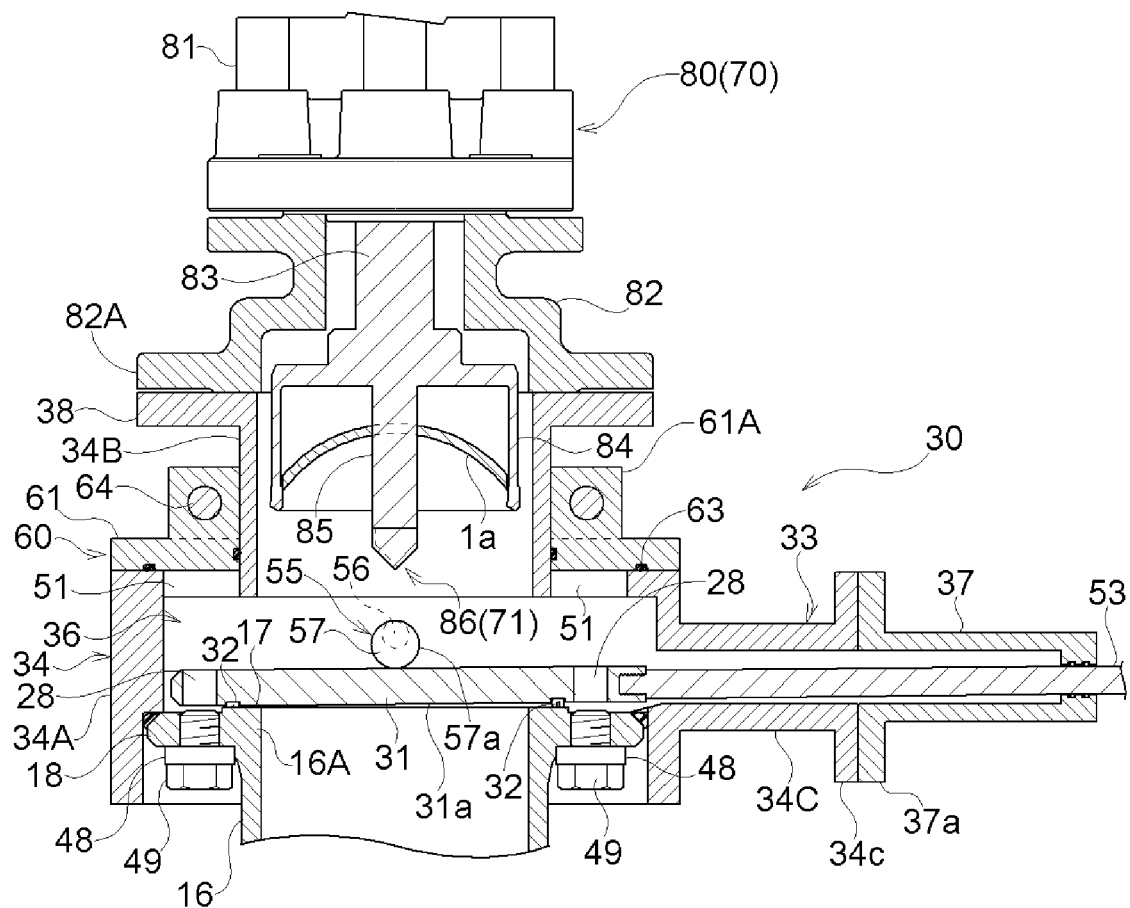
FIG. 19 is a sectional view when the drilling work is finished.

As illustrated in FIGS. 14 to 16, the large-diameter cylindrical portion 34A of the housing main body 34 is provided with a valve body-pressing portion 55 that presses the valve body 31 at the closed valve position against the ring-shaped valve seat surface 17 of the connection end surface 16a of the branch pipe 16 in a watertight state. The valve body-pressing portions 55 are provided in the large-diameter cylindrical portion 34A of the housing main body 34 at a plurality of locations (two locations in the circumferential direction in this embodiment) in the circumferential direction. Each of the valve body-pressing portions 55 includes a cam operation shaft 56 and an eccentric cam 57. The eccentric cam 57 is supported by the large-diameter cylindrical portion 34A in a state where the eccentric cam 57 penetrates therethrough and is rotationally operable around a horizontal axis. The eccentric cam 57 is eccentrically provided in an inner end portion of the cam operation shaft 56. As illustrated in FIGS. 19 and 21, due to the eccentric rotation of the eccentric cam 57, the eccentric cam 57 is configured to be able to press the first packing 32, which is installed on the flow path-blocking surface 31a of the valve body 31, against the ring-shaped valve seat surface 17 of the connection port portion 16A of the branch pipe 16 from the branch axis direction in a watertight state.

As illustrated in FIG. 21, the first packing 32 of the flow path-blocking surface 31a of the valve body 31 is most strongly pressed against the ring-shaped valve seat surface 17 of the connection port portion 16A of the branch pipe 16 by a cam surface portion in a cam surface 57a on the entire circumference of the eccentric cam 57, the cam surface portion being on a semi-major axis side where the radius from an eccentric axis is maximum. The pressing force by the eccentric cam 57 gradually decreases as the eccentric cam 57 rotates to a cam surface portion side on a semi-minor axis side where the radius from the eccentric axis is minimum, and when the eccentric cam 57 rotates to the cam surface portion side on the semi-minor axis side or the vicinity thereof, the pressing force by the eccentric cam 57 is released.

Subsequently, a method of a renewal and earthquake resistance work including a valve removal method will be described.

[11] Split T-Shaped Pipe Mounting Step

As illustrated in FIG. 17, a split T-shaped pipe mounting step of externally mounting and fixing the split T-shaped pipe 10 having a split structure and including the branch pipe 16 on a portion upstream of a work target region of the fluid pipe 1 in a watertight state is executed.

In the split T-shaped pipe mounting step, the split couplers 11 which are three split elements of the split T-shaped pipe 10 are externally mounted on the fluid pipe 1, and the coupling flange portions 11A of both split couplers 11 adjacent to each other are tightened and fixed to each other in a watertight state by the bolts 12 and the nuts 13.

Incidentally, for the description of the valve device 30, FIG. 17 illustrates a state where the through-hole 2 is formed in the fluid pipe 1; however, when the split T-shaped pipe 10 is installed, the through-hole 2 is not yet formed.

[12] Valve Device Mounting Step

As illustrated in FIG. 17, a valve device mounting step of mounting the valve device 30 to the branch pipe 16 of the split T-shaped pipe 10 in a watertight state is executed.

The valve device mounting step includes a housing-exterior mounting step of externally mounting the valve housing 33 of the valve device 30 on the first flange 18, which is provided in the connection port portion 16A of the branch pipe 16, from the branch axis direction, and a pulling and fixing step of pulling the valve housing 33 toward the first flange 18 of the branch pipe 16 by the pulling bolt 43 of the second fastening portion 6 provided in the valve housing 33, and fixing the valve housing 33 to the first flange 18 in a watertight state in a sealed manner.

In the housing-exterior mounting step, the installation port portion 40 of the large-diameter cylindrical portion 34A forming the valve housing 33 of the valve device 30 is externally fitted and installed on the first flange 18 of the branch pipe 16 from the branch axis direction.

In the pulling and fixing step, the pulling bolts 43 are screwed into the screw holes 42 that are formed in a plurality of the reinforcement portions 41 in the installation port portion 40 of the large-diameter cylindrical portion 34A. As illustrated in FIG. 17, the tapered surfaces 43a of the pulling bolts 43 come into contact with the pulling inclined surface 18a of the first flange 18 from outward in the radial direction, and as the pulling bolts 43 are tightened, the valve housing 33 of the valve device 30 is pulled toward and fixed to the connection port portion 16A side of the branch pipe 16. Due to the pulling and fixing, the second packing 35 which is installed at the inner corner of the installation port portion 40 is compressed in a watertight state by the packing-pressing inclined surface 18b of the first flange 18.

As illustrated in FIG. 18, the waterstop bolt 49 including the waterstop washer 48 is screwed into each of the screw holes 46 from below, the screw holes 46 being formed in the first flange 18 of the branch pipe 16, to prevent water from leaking from the screw hole 46 of the first flange 18.

In addition, as illustrated in FIG. 18, the hole closing tool 60 which has a split structure and closes all of the bolt insertion holes 51, which are formed in the annular step portion 34D, in a watertight state is mounted on the outer peripheral surface of the small-diameter cylindrical portion 34B of the housing main body 34 and the upper surface of the annular step portion 34D. The two split closing members 61 of the hole closing tool 60 are fixed and coupled to each other in an annular shape by tightening the coupling flange portions 61A, which are provided in the end portions of the two split closing members 61 in the circumferential direction using the bolts 64 and nuts. Since the both split closing members 61 are fixed and coupled, the first elastic seal member 62 which seals the gap between the both split closing members 61 and the outer peripheral surface of the small-diameter cylindrical portion 34B of the housing main body 34 is compressed in a watertight state, and the second elastic seal member 63 which seals the gap between the both split closing members 61 and the upper surface of the annular step portion 34D is compressed in a watertight state.

Furthermore, as illustrated in FIGS. 17 and 18, the eccentric cam 57 of the valve body-pressing portion 55 provided in the large-diameter cylindrical portion 34A of the housing main body 34 is held in a pressing force release state where the eccentric cam 57 is spaced apart from the upper surface of the valve body 31.

[13] Drilling Device Mounting Step

As illustrated in FIG. 18, a drilling device mounting step (one example of a work equipment mounting step) of mounting the drilling device 80 which is one example of the work equipment 70 on the valve device 30 is executed.

In the drilling device mounting step, the third flange 82A of the short pipe 82 coupled to the drilling drive case 81 of the drilling device 80 is tightened and fixed to the second flange 38 of the housing main body 34 in a watertight state by bolts and nuts.

When the drilling device 80 is mounted, since the through-hole 2 (refer to FIG. 4) is not formed in the fluid pipe 1, the valve body 31 of the valve device 30 is held at the open valve position.

[14] Drilling Work Performing Step

As illustrated in FIGS. 18 and 19, a drilling work performing step (one example of a work performing step) of performing a drilling work (one example of a predetermined work) where the rotary cutting tool 86 of the drilling device 80 is delivered inward toward a fluid pipe 1 side (refer to FIG. 17) which is a work target portion upstream of the branch pipe 16 and the through-hole 2 is formed in the pipe wall of the fluid pipe 1 is executed.

In the drilling work performing step, the virtual line in FIG. 18 illustrates a state where the rotary cutting tool 86 of the drilling device 80 is delivered into the branch pipe 16 of the split T-shaped pipe 10. FIG. 19 illustrates a state where after the drilling work is performed, the rotary cutting tool 86 holding the cut piece 1a of the pipe wall moves to return to an initial position above the valve body 31 inside the housing main body 34.

[15] Drilling Device Removing Step

A drilling device removing step (one example of a work equipment removing step) of removing the drilling device 80 from the valve device 30 after the valve body 31 of the valve device 30 is operated to the closed valve position is executed.

In the drilling device removing step, the fixing and coupling of the second flange 38 of the housing main body 34 to the third flange 82A of the short pipe 82 of the drilling device 80 is released, and the drilling device 80 is removed from the valve device 30. In addition, when the valve body 31 of the valve device 30 is operated to the closed valve position, the cam operation shaft 56 of the valve body-pressing portion 55 provided in the large-diameter cylindrical portion 34A of the housing main body 34 is rotationally operated to a pressing operation position (refer to FIG. 21). Due to the rotation of the cam operation shaft 56, the cam surface portion on the semi-major axis side where the radius from the eccentric axis is maximum in the cam surface 57a on the entire circumference of the eccentric cam 57 presses the upper surface of the valve body 31. Accordingly, the first packing 32 of the flow path-blocking surface 31a of the valve body 31 is maintained in a watertight state where the first packing 32 is crimped by the ring-shaped valve seat surface 17 of the connection port portion 16A of the branch pipe 16.

[16] Flow Path-Closing Device Mounting Step

Figure 20:
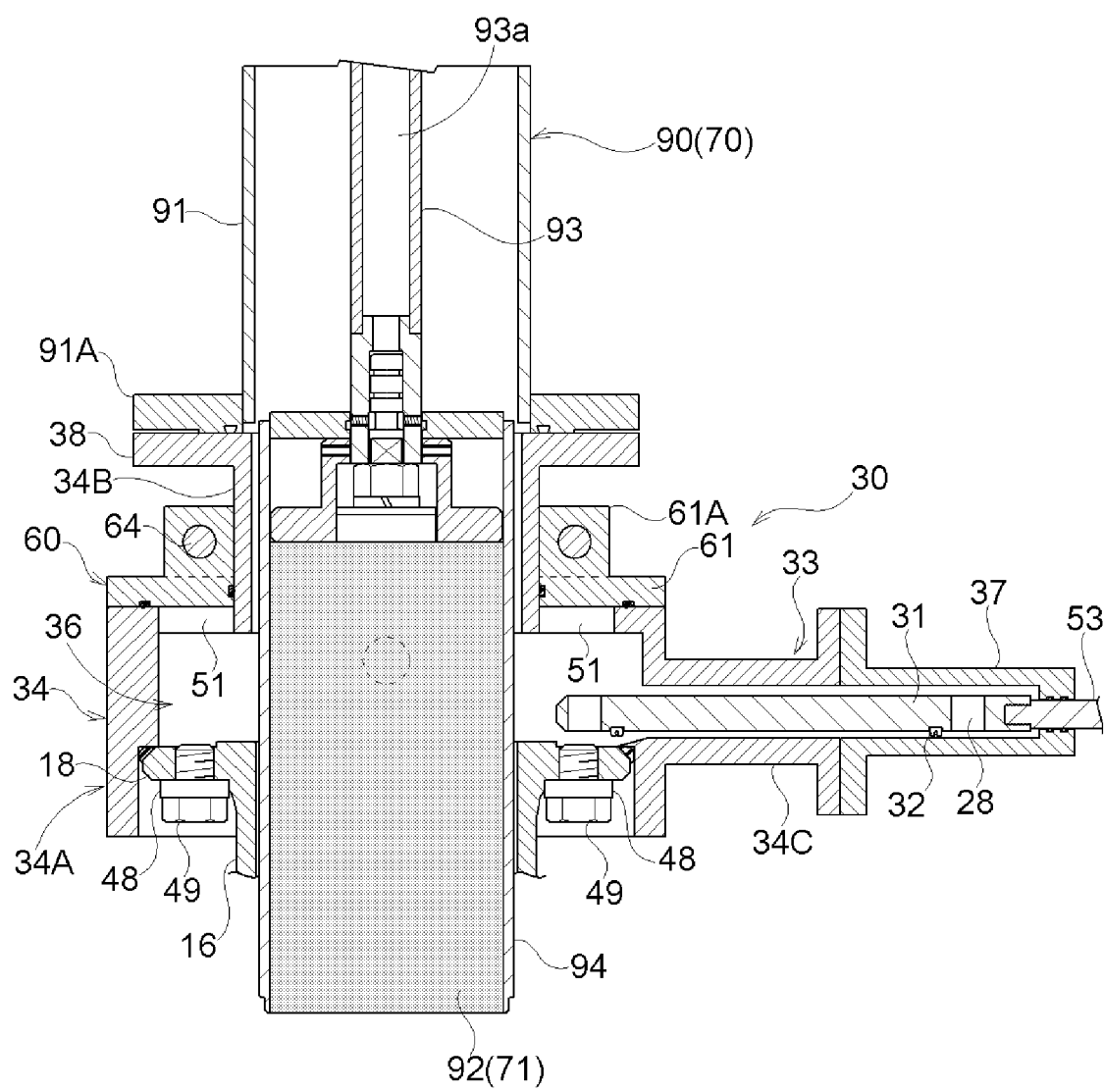
FIG. 20 is a sectional view when an in-pipe path closing work is started.

As illustrated in FIG. 20, a flow path-closing device mounting step (one example of a work equipment mounting step) of mounting the flow path-closing device 90 which is one example of the work equipment 70 on the valve device 30 is executed.

In the flow path-closing device mounting step, the fourth flange 91A of the closing case 91 of the flow path-closing device 90 is tightened and fixed to the second flange 38 of the housing main body 34 in a watertight state by bolts and nuts. In this coupling state, the closing bag 92 in a reduced state, which is one example of the closing work portion and is accommodated in the closing case 91, faces the internal flow path 36 of the housing main body 34.

[17] Flow Path Closing Work Step

As illustrated in FIG. 20, a flow path closing work step (one example of a predetermined work step) of operating the valve body 31 of the valve device 30 to the open valve position and delivering the closing bag 92 of the flow path-closing device 90 into the fluid pipe 1 (refer to FIG. 17) which is a closing work target portion on the upstream side to close the in-pipe flow path is executed.

In the flow path closing work step, before the valve body 31 of the valve device 30 is operated to the open valve position, the cam operation shaft 56 of the valve body-pressing portion 55 is rotationally operated from the pressing operation position to a pressing release position, and the eccentric cam 57 is held in a pressing force release state where the eccentric cam 57 is spaced apart from the upper surface of the valve body 31.

Subsequently, after the valve body 31 is operated to the open valve position, the operation cylinder shaft 93 is delivered inward from outside the closing case 91, and the insertion guide cylinder body 94 and the closing bag 92 are integrally delivered inward. Thereafter, the insertion guide cylinder body 94 comes into contact with the opening peripheral edge of the through-hole 2 in the outer peripheral surface of the fluid pipe 1 to stop. In this state, when the operation cylinder shaft 93 is delivered further inward, the closing bag 92 is pulled out from the insertion guide cylinder body 94, and the closing bag 92 is inserted into a predetermined close position in the in-pipe flow path from the through-hole 2 of the fluid pipe 1. In this state, the fluid for diameter expansion is supplied into the closing bag 92 from the supply and discharge flow path 93a inside the operation cylinder shaft 93, so that the closing bag 92 inflates to a state where the in-pipe flow path inside the fluid pipe 1 is closed.

Then, when the in-pipe flow path inside the fluid pipe 1 is closed by the closing bag 92 of the flow path-closing device 90, in a work target region downstream of the close position, a predetermined work such as a renewal work where the fluid pipe 1 forming a pipeline structure or piping equipment such as a fire hydrant is renewed without water disruption, or an earthquake resistance work where piping equipment for earthquake resistance is replaced without water disruption is performed.

[18] Flow Path-Closing Device Removing Step

As illustrated in FIG. 21, a flow path-closing device removing step (one example of the work equipment removing step) of removing the flow path-closing device 90 from the valve device 30 after the valve body 31 of the valve device 30 is operated to the closed valve position is executed.

In the flow path-closing device removing step, when the predetermined work is finished, the fluid for diameter expansion in the closing bag 92 which closes the in-pipe flow path inside the fluid pipe 1 is discharged from the supply and discharge flow path 93a inside the operation cylinder shaft 93, so that the closing bag 92 is brought into a contracted state where the diameter thereof is reduced. In this state, the operation cylinder shaft 93 returns upward, so that the closing bag 92 and the insertion guide cylinder body 94 are accommodated in the closing case 91.

Subsequently, after the valve body 31 is operated to the closed valve position, the coupling between the second flange 38 of the housing main body 34 and the fourth flange 91A of the closing case 91 is released, and the flow path-closing device 90 is removed from the valve device 30. After the flow path-closing device removing step is finished, the procedure proceeds to the valve removal method.

[19] Valve Body Fixing Step of Valve Removal Method

As illustrated in FIGS. 21 to 23, a valve body fixing step of fixing the valve body 31 of the valve device 30 at the closed valve position to the connection port portion 16A of the branch pipe 16 in a sealed manner is executed.

The valve body fixing step includes valve body pressing step of pressing the valve body 31 at the closed valve position against the connection end surface 16a of the connection port portion 16A of the branch pipe 16 in a watertight state using the valve body-pressing portion 55 provided in the valve housing 33 of the valve device 30, and a valve body fixing and coupling step of fixing and coupling the valve body 31, which is pressed, to the first flange 18 of the branch pipe 16 in a watertight state using the valve-fixing bolt 45 and the nut 29 of the first fastening portion 5.

In the valve body pressing step illustrated in FIG. 21, the cam operation shaft 56 of the valve body-pressing portion 55 provided in the large-diameter cylindrical portion 34A of the housing main body 34 is rotationally operated to the pressing operation position, so that the upper surface of the valve body 31 is pressed by the cam surface portion on the semi-major axis side where the radius from the eccentric axis is maximum in the cam surface 57a on the entire circumference of the eccentric cam 57. Accordingly, the first packing 32 of the flow path-blocking surface 31a of the valve body 31 is crimped in a watertight state by the ring-shaped valve seat surface 17 of the connection port portion 16A of the branch pipe 16.

In the valve body fixing and coupling step illustrated in FIG. 22, firstly, the waterstop bolts 49 with the waterstop washers 48 which are screwed into the screw holes 46 in the first flange 18 of the branch pipe 16 are detached. In addition, the two split closing members 61 of the hole closing tool 60 mounted on the outer peripheral surface of the small-diameter cylindrical portion 34B of the housing main body 34 and the upper surface of the annular step portion 34D are removed, so that all of the bolt insertion holes 51 formed in the annular step portion 34D are opened.

Subsequently, as illustrated in FIGS. 22 and 23, the valve-fixing bolts 45 are inserted into the housing main body 34 from the bolt insertion holes 51 of the annular step portion 34D, and the valve-fixing bolts 45 pass through the mounting holes 28 of the valve body 31 to be inserted into the screw holes 46 of the first flange 18. The nuts 29 are screwed onto the tip side screw portions of the valve-fixing bolts 45 that protrude downward from the screw holes 46 of the first flange 18, and the valve-fixing bolts 45 and the nuts 29 are tightened and fixed.

In a state where the valve body 31 is fixed to the first flange 18 of the branch pipe 16, the first packing 32 of the flow path-blocking surface 31a of the valve body 31 is maintained in a watertight state where the first packing 32 is crimped by the ring-shaped valve seat surface 17 of the connection port portion 16A of the branch pipe 16.

[20] Valve Component Removing Step of Valve Removal Method

Figure 24:
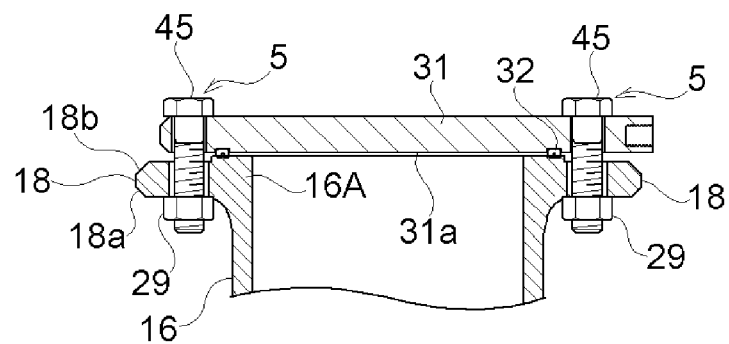
FIG. 24 is a sectional view when other valve components of the valve device are removed while the valve body is left.

As illustrated in FIGS. 23 and 24, a valve component removing step of removing valve components of the valve device 30 other than the valve body 31 from the first flange 18 of the branch pipe 16 while the valve body 31 fixed to the first flange 18 of the branch pipe 16 is left is executed.

The valve component removing step includes a step of detaching and removing the operating member 53, which has a substantially T shape and operates the valve body 31, from the valve body 31 by an operation from outside the valve housing 33 of the valve device 30.

In detail, as illustrated in FIG. 23, firstly, the female screw portion 31c at the tip of the operating member 53, which is screwed onto the male screw portion 53a of the valve body 31, is detached therefrom, and then as illustrated in FIG. 24, the valve housing 33 which is another valve component and is externally fitted and installed on the first flange 18 of the branch pipe 16 is lifted upward and removed.

In this case, the maximum dimension of the valve body 31 is the outer dimension in the diameter direction which passes through the center line of the female screw portion 31c; however, since the maximum dimension of the valve body 31 is a smaller diameter than the inner diameter D2 of the small-diameter inner peripheral surface 34a in the large-diameter cylindrical portion 34A of the housing main body 34, or the cutout portion through which the protrusion portion of the female screw portion 31c of the valve body 31 can pass is formed in the large-diameter cylindrical portion 34A of the housing main body 34, the valve housing 33 can be smoothly pulled out along the branch axis direction without the large-diameter cylindrical portion 34A of the housing main body 34 being caught by the valve body 31.

First Example of Second Embodiment

Figure 25:
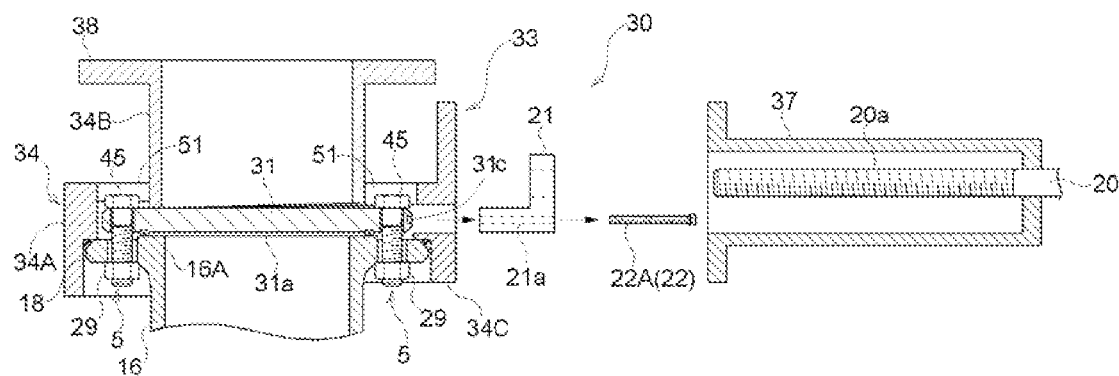
FIG. 25 is a sectional view of a valve device illustrating a first example of the second embodiment.
Figure 26:
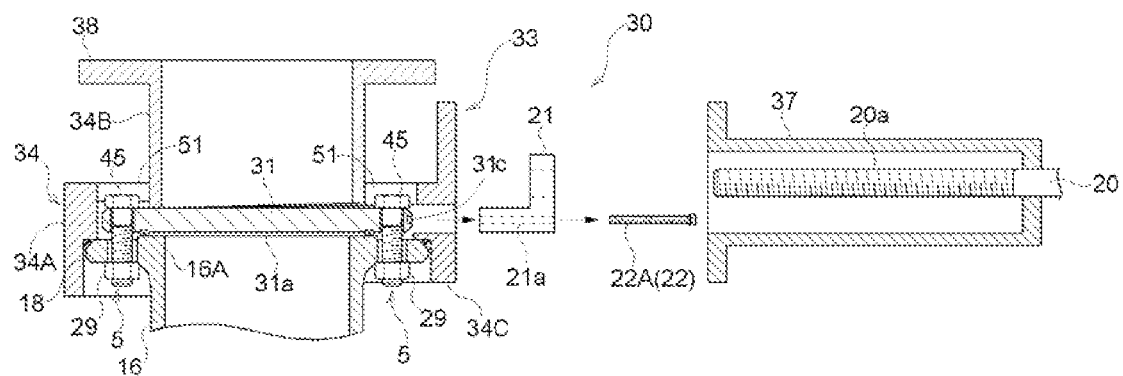
FIG. 26 is a sectional view when a part of valve components of the valve device is separated.

FIGS. 25 and 26 illustrate a first example of the opening and closing operation structure of the valve device 30 in the second embodiment. In the valve device 30 of the first example, a screw piece 21 is screwed onto a screw portion 20a of a valve shaft 20 that is supported on the valve housing 33 and is rotationally operable from outside. A coupling portion 22 which detachably couples the screw piece 21 and the valve body 31 is provided such that the coupling portion 22 can be decoupled from outside the valve housing 33.

The coupling portion 22 is formed by screwing a coupling bolt 22A, which is inserted into a through-hole 21a penetrating through the screw piece 21, into the female screw portion 31c of the valve body 31.

For this reason, as illustrated in FIG. 26, it is possible to easily perform the screw coupling operation of the coupling bolt 22A with respect to the female screw portion 31c of the valve body 31 and perform a screw release operation from outside the housing main body 34 by detaching the valve guide case 37 from the valve guide cylinder portion 34C of the housing main body 34.

Incidentally, since other configurations are the same as the configurations described in the second embodiment, the same reference numbers as those in the first embodiment are assigned to the same components, and the descriptions thereof will be omitted.

Second Example of Second Embodiment

Figure 27:
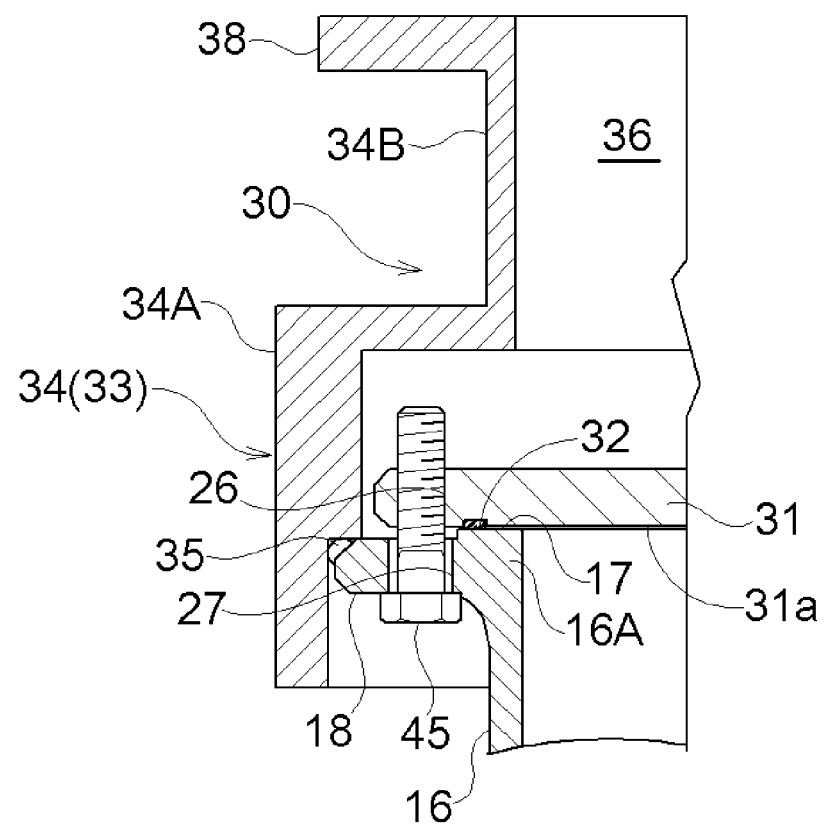
FIG. 27 is an enlarged sectional view of a main part of a valve device illustrating a second example of the second embodiment.

FIG. 27 illustrates a second example of a structure where the first flange 18 of the branch pipe 16 and the valve body 31 are fixed and coupled to each other in the second embodiment. In the valve device 30 of the second example, through-holes 27 serving as coupling holes into which valve-fixing bolts 45 that fix the valve body 31 at the closed valve position in a watertight state are inserted from below are formed in the first flange 18 of the branch pipe 16 at a plurality of locations (six locations in this embodiment) in the circumferential direction. In addition, screw holes 26 which are screwed onto the valve-fixing bolts 45 inserted into the through-holes 27 of the first flange 18 are formed in the valve body 31 at a plurality of locations (six locations in this embodiment) in the circumferential direction.

In the second example, it is not required that as in the second embodiment, the bolt insertion hole 51 through which the valve-fixing bolt 45 is inserted into the internal space of the housing main body 34 is formed in the annular step portion 34D of the housing main body 34, and it is not also required that as in the second embodiment, when the valve body 31 is not fixed to the first flange 18, the hole closing tool 60 which has a split structure and closes all of the bolt insertion holes 51 in a watertight state is mounted on the housing main body 34. For this reason, it is possible to simplify the valve device 30 and improve the work efficiency.

Incidentally, since other configurations are the same as the configurations described in the second embodiment, the same reference numbers as those in the first embodiment are assigned to the same components, and the descriptions thereof will be omitted.

OTHER EMBODIMENTS (1) In each of the foregoing embodiments, a configuration where the valve body 31 of the valve device 30 is opened and closed by a manual operation has been described; however, the technique of the present invention can be also applied to the valve device 30 in which the valve body 31 is opened and closed by an actuator such as a hydraulic cylinder or a motor.

(2) In the valve device 30 of the first embodiment, the valve body-pressing portion 160 includes the female screw member 161 that is provided in the top plate 102A of the housing main body 102 at each of the plurality of locations in the circumferential direction, and the push bolt 162 screwed into the female screw member 161. In addition, in the valve device 30 of the second embodiment, the valve body-pressing portion 55 includes the cam operation shaft 56, which includes the eccentric cam 57, in the large-diameter cylindrical portion 34A of the housing main body 34 at each of the plurality of locations in the circumferential direction. However, the present invention is not limited to these configurations. For example, an actuator such as a hydraulic cylinder or a motor may be used as the valve body-pressing portion to press the first packing 32, which is installed on the flow path-blocking surface 31a of the valve body 31, against the ring-shaped valve seat surface 17 of the connection port portion 16A of the branch pipe 16 from the branch axis direction. In summary, any type of a valve body-pressing portion may be used as long as the valve body-pressing portion can press the valve body 31 at the closed valve position against the connection end surface 16a of the connection port portion 16A of the branch pipe 16 in a watertight state.

(3) In each of the foregoing embodiments, the valve device mounting step includes the housing-exterior mounting step of externally mounting the valve housing 33 of the valve device 30 on the first flange 18, which is provided in the connection port portion 16A of the branch pipe 16, from the branch axis Y direction; however, in the housing-exterior mounting step, the valve housing 33 having a split structure in the valve device 30 may be externally mounted on the first flange 18, which is provided in the connection port portion 16A of the branch pipe 16, from outward in the radial direction.

(4) In each of the foregoing embodiments, the valve-fixing bolt 45 forms the first fastening portion 5 that fixes the valve body 31 to the first flange 18 of the branch pipe 16 in a sealed manner; however, the present invention is not limited to this configuration. Any type of a fastening portion may be used as the first fastening portion 5 as long as the fastening portion can fix the valve body 31 to the first flange 18 of the branch pipe 16 in a sealed manner.

(5) In each of the foregoing embodiments, the valve body 31 has a plate shape; however, the valve body may be a gate valve which is generally used.

(6) In the second hole closing tool 180 of the first embodiment, the second plug members 182 which are detachably fitted into the three first bolt insertion holes 19 positioned in a semi-circular region are firmly fixed to each of the pair of second closing support plates 181 of which each has a semi-annular shape; however, the present invention is not limited to this configuration. For example, the second plug members 182 may be configured to be individually attachable to and detachable from the first bolt insertion holes 19.

INDUSTRIAL APPLICABILITY

The present invention can be suitably applied to a valve removal method of a fluid pipeline structure, and a fluid pipeline structure and a valve device useful for the method, in which unnecessary valve components of the valve device can be efficiently removed from the connection port portion of the pipe in a state where an opening of a connection port portion of a pipe is securely sealed, and work costs can be reduced by reducing the number of closing components.

The invention claimed is:

1. A valve removal method of a fluid pipeline structure, which removes an unnecessary portion of a valve device from a connection port portion side of a pipe without flow disruption in the fluid pipeline structure where the valve device, which comprises a valve body that is openable and closeable from a direction intersecting a flow path axis of a connection port portion and a valve housing accommodating the valve body, is detachably provided on the connection port portion side of the pipe connected to a fluid piping system, the method comprising:
a valve body fixing step of fixing the valve body at a closed valve position to the connection port portion side in a sealed manner; and
a valve component removing step of removing other unnecessary valve components including the valve housing in the valve device in a state where the valve body which is fixed in a sealed manner is left on the connection port portion side.

2. The valve removal method of a fluid pipeline structure according to claim 1,
wherein between a valve device mounting step of mounting the valve device on the connection port portion of the pipe and the valve body fixing step, a work equipment mounting step of mounting work equipment on the valve device, a predetermined work step of operating the valve body of the valve device to an open valve position and delivering a work portion of the work equipment into a work target region in a pipeline from an opening of the connection port portion to perform a predetermined work, and a work equipment removing step of taking the work portion out of the pipe after the predetermined work step is finished, operating the valve body to the closed valve position, and then removing the work equipment from the valve device are executed.

3. The valve removal method of a fluid pipeline structure according to claim 1,
wherein the valve body fixing step includes a valve body pressing step of pressing the valve body at the closed valve position against a connection end surface of the connection port portion in a sealed state using a valve body-pressing portion provided in the valve housing of the valve device, and a fastening and fixing step of fixing the valve body in a sealed state to the connection port portion side of the pipe using a first fastening portion.

4. The valve removal method of a fluid pipeline structure according to claim 1,
wherein the valve component removing step includes a step of removing the valve housing of the valve device, to which at least a part of a remaining portion of the valve device other than the valve body is integrally assembled, from the connection port portion side of the pipe.

5. A fluid pipeline structure which is used in the valve removal method of a fluid pipeline structure according to claim 1,
wherein the valve housing of the valve device is provided with an installation port portion that is externally mountable on a flange of the connection port portion of the pipe from a flow path axis direction in a detachable manner, and the valve body has a smaller external shape than that of the installation port portion of the valve housing, and comprises a packing that comes into contact with a ring-shaped valve seat surface formed in a connection end surface of the connection port portion.

6. The fluid pipeline structure according to claim 5,
wherein the pipe is provided with a load receiving portion which protrudes further outward in a radial direction than an outer peripheral surface of the flange of the connection port portion and on which the installation port portion of the valve housing is placed and supported, so as to be detachable, and in a state where the installation port portion of the valve housing is placed and supported on the load receiving portion, a sliding guide surface inside the valve housing, which guides sliding of the packing of the valve body, and the ring-shaped valve seat surface of the connection port portion are disposed at the same or substantially the same height position.

7. The fluid pipeline structure according to claim 6,
wherein a hole closing tool comprising a sealing and closing portion which closes a coupling hole of the flange in a sealed state is detachably mounted between a pipe main body including the pipe and the flange, and the hole closing tool is provided with the load receiving portion.

8. The fluid pipeline structure according to claim 5,
wherein inside the valve housing of the valve device, a rotary arm which is rotationally operable around an axis parallel to or substantially parallel to a flow path axis of the connection port portion of the pipe is provided and a linkage mechanism which causes the valve body to reciprocate between a closed valve position and an open valve position in conjunction with a rotation of the rotary arm is provided, and the linkage mechanism is configured to be changeable between a linked state and a non-linked state in the flow path axis direction and to be changed to the non-linked state as the valve housing moves along the flow path axis direction to separate from the valve body fixed to the connection port portion side.

9. The fluid pipeline structure according to claim 5, wherein a linear guide portion which guides the valve body to move in a non-rotatable state between a closed valve position and an open valve position in a linear direction is provided on an inner surface side of the valve housing.

10. A valve device which is used in the fluid pipeline structure according to claim 5,
wherein the valve body includes a packing that comes into contact with a ring-shaped valve seat surface formed in a connection end surface of the connection port portion, and a mounting hole for fixing a bolt to a flange of the connection port portion.

* * * * *